United States Patent [19]

Nally et al.

[11] Patent Number: 4,490,850

[45] Date of Patent: Dec. 25, 1984

[54] MATRIX CHARACTER RECOGNITION

[75] Inventors: Robert B. Nally; James F. Akister; Patrick C. Leung, all of Waterloo; Eric J. Vance, Kitchener, all of Canada

[73] Assignee: NCR Corporation, Dayton, Ohio

[21] Appl. No.: 331,935

[22] Filed: Dec. 17, 1981

[51] Int. Cl.³ .............................................. G06K 9/68
[52] U.S. Cl. .................................................... 382/34
[58] Field of Search .................. 382/14, 27, 35, 34, 382/20

[56] References Cited

U.S. PATENT DOCUMENTS

| | | | |
|---|---|---|---|
| 3,522,586 | 8/1966 | Kiji et al. | 382/18 |
| 3,564,498 | 1/1966 | Stern | 382/27 |
| 3,576,534 | 4/1971 | Steinberger et al. | 382/30 |
| 4,153,897 | 5/1979 | Yasuda et al. | 382/34 |
| 4,334,241 | 6/1982 | Kashioka et al. | 358/107 |

Primary Examiner—John C. Martin
Attorney, Agent, or Firm—J. T. Cavender; Wilbert Hawk, Jr.; Richard W. Lavin

[57] ABSTRACT

A character recognition system is disclosed in which each row of a plurality of parallel rows of binary signals representing the configuration of an unknown character is sequentially compared to a plurality of templates, each representing a known character. Each of the rows of signals is compared to feature characteristics of the unknown character twice. The rows of signals are first shifted one signal position and compared. The signals are then compared in their original position to detect an unknown character which has been printed off-center. Only those rows of signals which are required to contain a feature characteristic of the unknown characters are compared. The resulting data is utilized by a data processor apparatus identifying the unknown character.

11 Claims, 31 Drawing Figures

FIG. 2A

```
                    FEATURE                              FEATURE #
BIT #    14 13 12 11 10 9 8 7 6 5 4 3 2 1
          0  0  0  0  0 0 0 1 1 1 1 1 1 1                  F1
WEIGHTS*: L  L  L  L  L 8 4 4 4 4 4 4 4 2

0  0  0  0  0 0 0 0 0 0 0 0 1 1                  F2
          L  L  L  L  L L L L L L 8 4 6 6

0  0  0  0  0 1 1 0 0 0 0 0 0 0                  F3
          L  L  L  L  L 8 4 6 6 4 8 L L L
```

*L = LOGICAL

FIG. 2B

| ROW # | ALLOWED FEATURES |
|---|---|
| 1 | F1 |
| 2 | F1, F2 |
| 3 | F1, F2 |
| 4 | F1. |
| 5 | F1 |
| 6 | F1, F3 |
| 7 | F1 |
| 8 | F0 (BLANK FEATURE) |

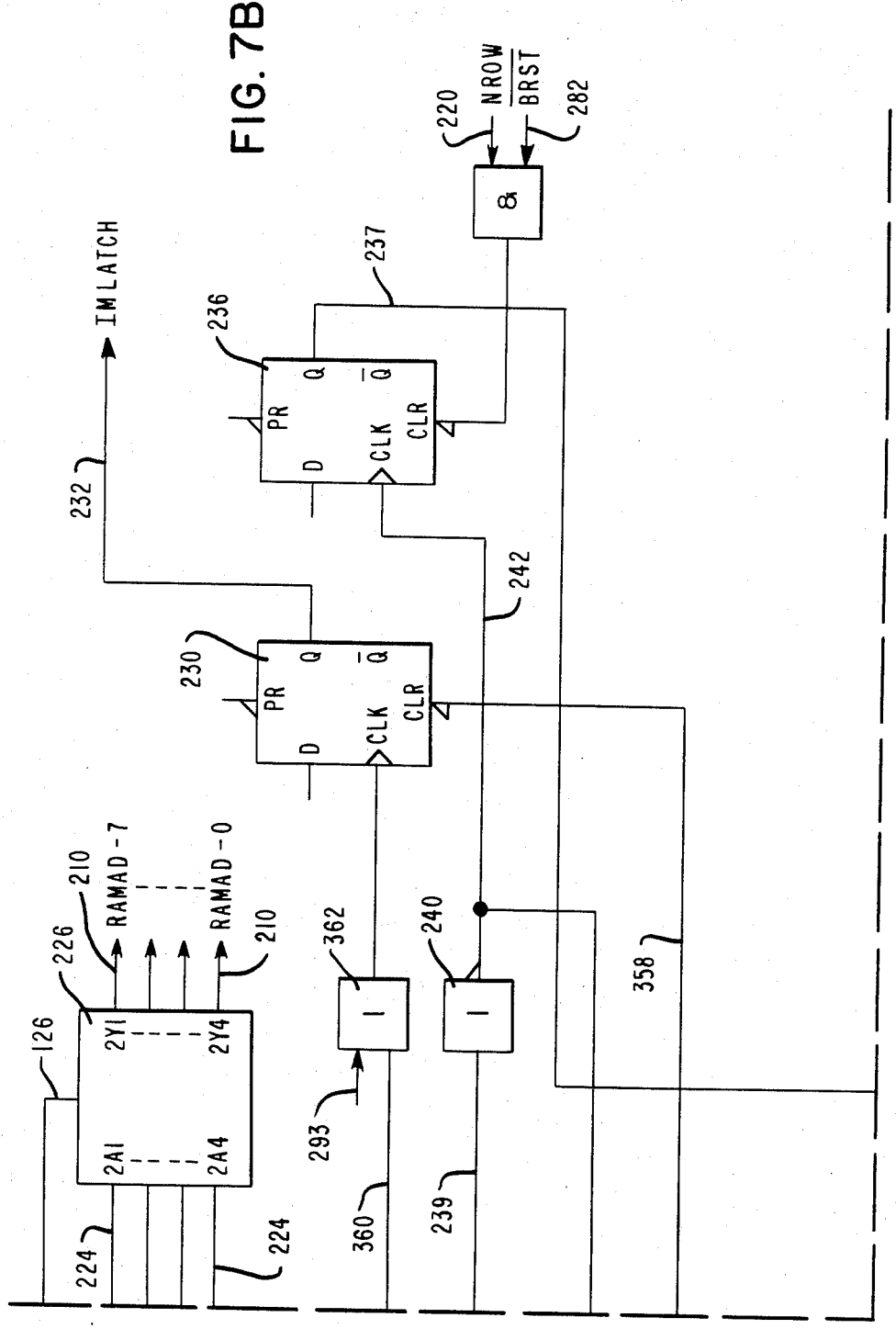

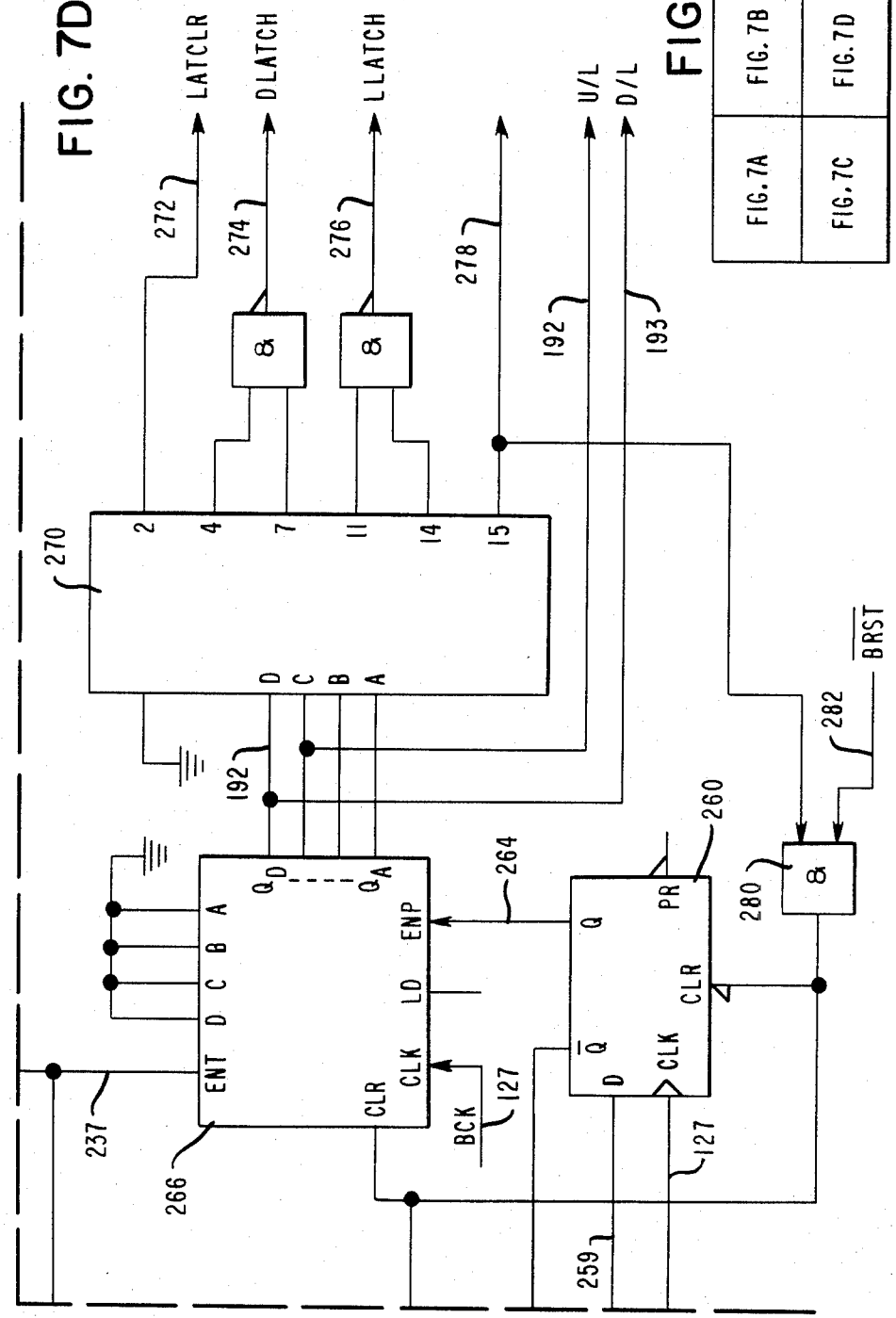

FIG.16
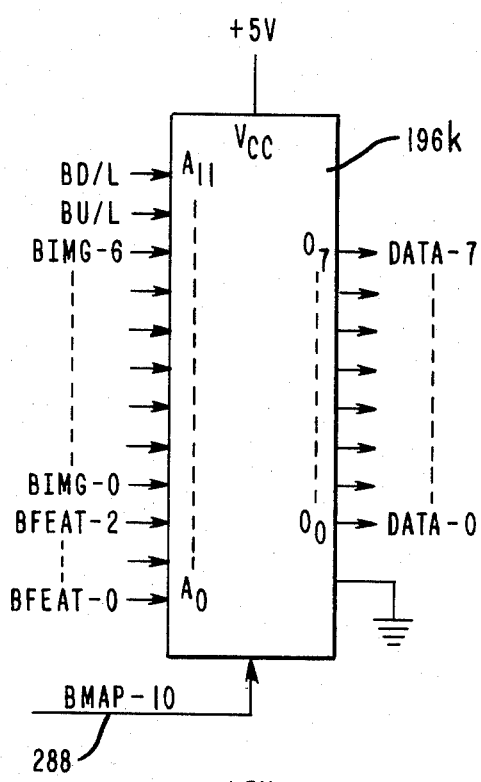
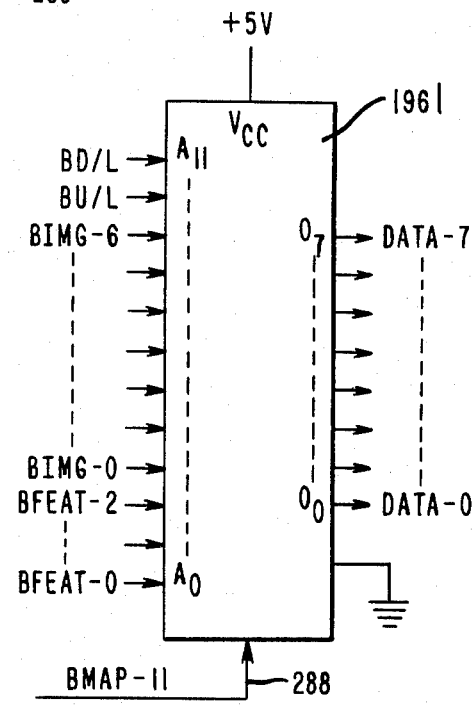

FIG.17
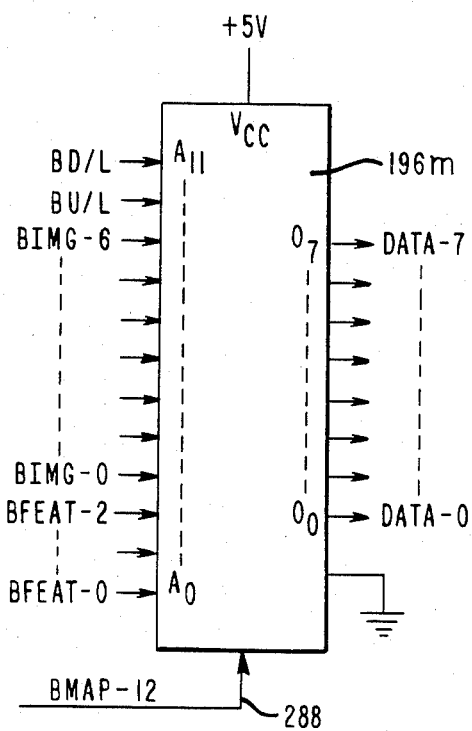
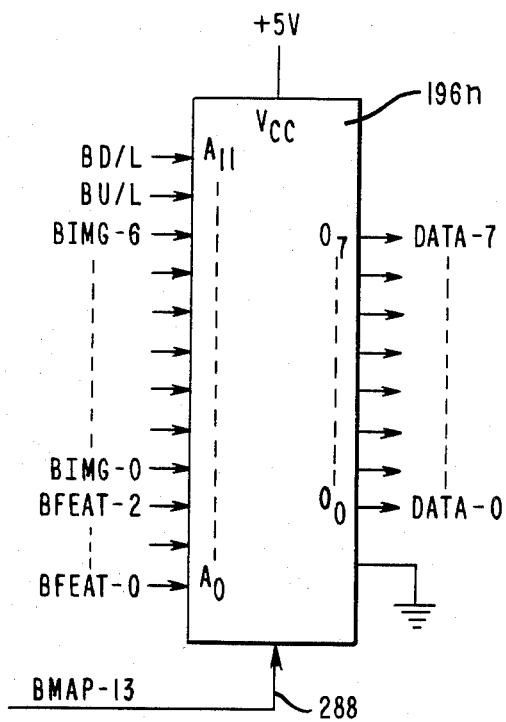

MATRIX CHARACTER RECOGNITION

CROSS-REFERENCE TO RELATED APPLICATIONS

Reference is hereby made to the following copending patent applications, filed on even date herewith and assigned to the NCR Corporation; Matrix Character Reading System, Ser. No. 331,946, by Nally et al., and Matrix Character Preprocessing System, Ser. No. 331,936, by Nally et al.

BACKGROUND OF THE INVENTION

The present invention relates to the field of machine recognition of magnetically printed characters on a document, and more particularly to a document reader system in which a multiple-gap magnetic read head is used in reading magnetized characters embodying the form of E-13B character fonts printed on a document.

In single-gap magnetic character reading systems, a single analog input waveform is obtained by passing the characters to be sensed, normally printed on a document, beneath a magnetic read head at least as wide as the height of the characters and having a single flux gap. The signal generated by the read head is a derivative waveform representing the rate of change of magnetic flux transversing the head as the characters are scanned. Since the distribution of ink, and thus flux, associated with each different character is unique, the waveform derived for each different character uniquely identifies that character.

In order to increase the amount of information that can be obtained when scanning the magnetically imprinted characters, multiple-gap magnetic read heads have been proposed in which multiple waveforms are produced. Whereas the single-gap read head produces an analog waveform as a result of the D.C. magnetization of the channel to be read, the multiple-gap read head produces a magnetic image of the character as the result of the A.C. magnetization of the characters. Problems found in using a multiple-gap read head lie in the size of the read head compared to the size of the character to be read, together with the failure to print portions of the character during the printing operation. The read head itself consists of thirty separate tracks or channels which cover approximately 0.52 inches of the allowable magnetic ink character recognition (MICR) band. A MICR reader, however, ideally spans about eight tracks (that is, about 0.12 inches). Therefore, every tenth channel is multiplexed together and brought out as a single channel. That is, tracks 1, 11 and 21 are tied together and brought out as channel 1, tracks 2, 12 and 22 are tied together and brought out as channel 2, and so on.

If a MICR character is positioned in the MICR band on a document such that the top of the character crosses tracks 1, 11 and 21 of the read head, then output channels 1-8 inclusive will transmit the signal with channels 9 and 10 blank. In this case, the character scanned in each of the channels is properly orientated. If however, the top of a MICR character crosses track 15, for example, so that it covers tracks 15-22, then output channel 5 will contain the top-of-character signal and output channel 2 will contain the bottom-of-character signal with channels 3 and 4 blank. In this case, the character image is said to be folded. As part of the preprocessing of the data generated by the read head, the image must be unfolded so that it covers channels 1-8 inclusive with channels 9 and 10 blank. As fully disclosed in the copending application of Nally et al., Ser. No. 331,936, data is generated identifying the top channel of the character. This data is transmitted to a feature matching unit which matches each row of data of the character with the corresponding row of a plurality of templates associated with known characters in order to obtain information enabling the unknown character to be identified. It is therefore an object of this invention to provide an improved method for matching data representing an unknown character with templates associated with known characters for use in recognizing the unknown character. It is a further object of this invention to provide an apparatus for matching templates with rows of data bits each representing a portion of the character in such a manner as to allow the recognition of the unknown character to take place with a high degree of success.

SUMMARY OF THE INVENTION

These and other objects of this invention are fulfilled by providing a feature matching system in which a multi-channel read head generates a plurality of analog signals forming an image of the character read. The analog signals are digitized, rectified and thresholded to provide a multi-column binary bit map of the character in which a binary 1 represents a spot of ink and a binary 0 represents a blank space. The binary bit map is examined to locate the top channel of the character. The unique features of a known character that are allowed to occur in each row of each reference character are programmed and stored in a feature look-up table. When a row is to be matched, this information is retrieved from the table for use in matching the row with a corresponding row of a reference character. A feature matching cycle will be initiated only if an allowed feature is found. The bit map is then applied to a template located in a look-up table. The look-up table will output the results of the comparison between all of the allowed features in the character and any possible bit patterns that may occur. A row of data is matched twice with that of each reference character, with the first matching operation occurring with the bit map shifted one column left from its reference position and the second feature matching operation occurring with the bit map at its original reference position. After the top row of the unknown character is matched with all the templates, the matching process continues until the eight rows of the unknown character are matched. The data generated as a result of the matching operation is outputted to a recognition logic unit which takes the data generated for use in identifying the unknown character.

BRIEF DESCRIPTION OF THE DRAWINGS

The foregoing and various other objects, acknowledged advantages and meritorious features of the present invention will be apparent from the following detailed description and appended claims, when read in conjunction with the drawings, wherein like numerals identify corresponding elements:

FIG. 2A is a table showing the feature set for the character "2";

FIG. 2B is a table showing the allowed features for each row of the character "2" used in matching the unknown character with the known characters in the template;

FIG. 5E, is a diagram showing the manner in which FIGS. 5A-5E inclusive are arranged to form the logic circuits;

FIGS. 7A-7D inclusive, taken together, disclose the logic circuits found in the feature select control logic and the feature matching control logic units of FIG. 4A;

FIG. 8, on the sheet containing FIG. 7D, is a diagram showing the manner in which FIGS. 7A-7D inclusive are arranged to form the logic circuits;

FIGS. 15-17 inclusive are diagrams of the logic circuits used in the template matching units of FIG. 4B.

DESCRIPTION OF THE PREFERRED EMBODIMENT

Figure 1:
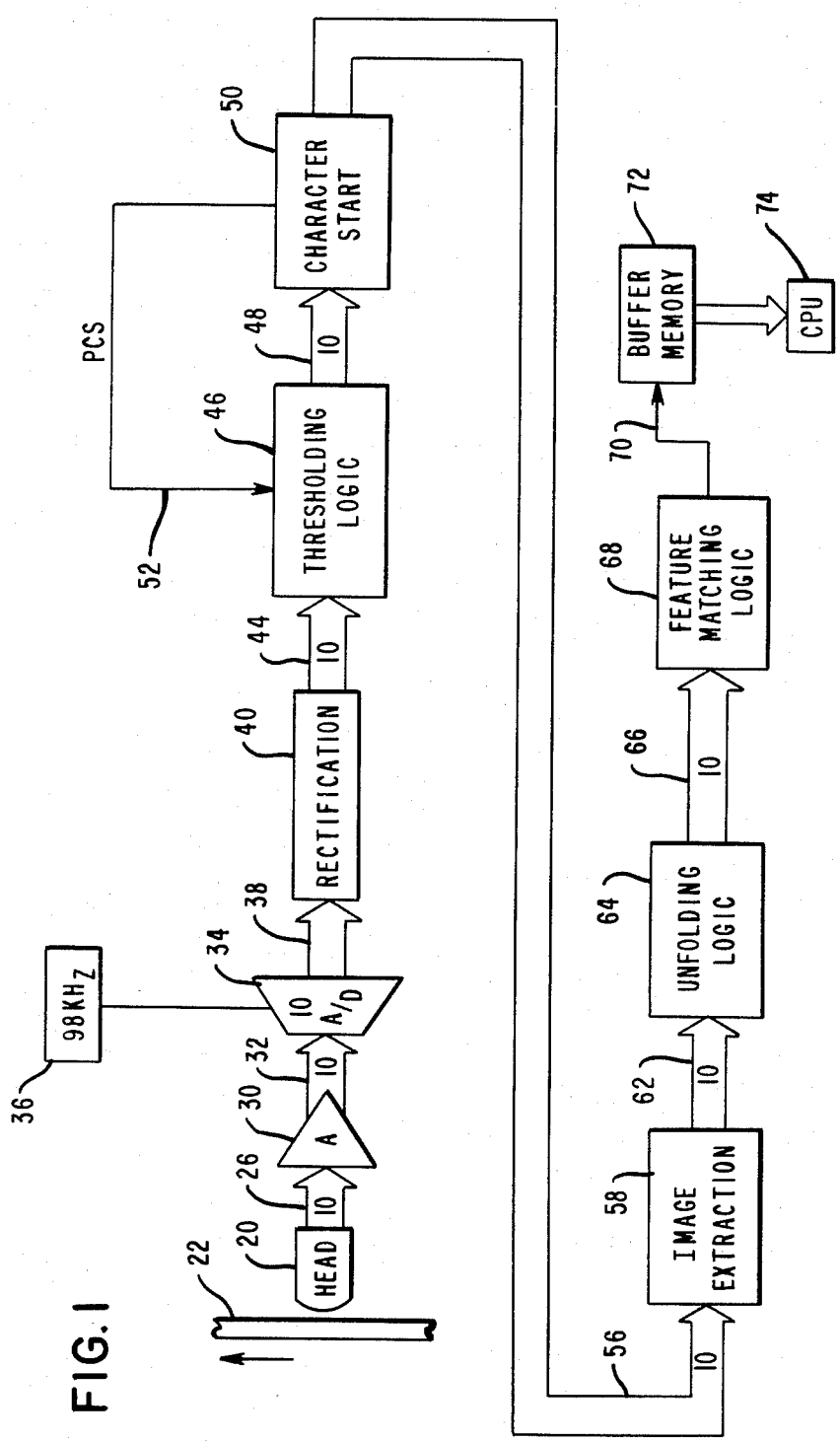
FIG. 1 shows a block diagram of the character reading system in which the present invention is found.

Referring now to FIG. 1, there is shown a block diagram of the character recognition system which includes a multi-gap magnetic read head 20 positioned adjacent the path of movement of a document 22 having characters printed thereon in magnetic ink. While the preferred character in the present embodiment are printed in the form of the E-13B character font, which is well-known in the art and which has been adapted by the American Bankers Association for use with banking checks in this country, it is obvious that the recognition system of the present invention can be used with any character font which produces an image of the character read when scanned by the read head 20. The read head 20 consists of thirty magnetic pick-up channels in which every tenth channel is multiplexed to output ten channels of discrete analog signals over a bus 26 upon movement of the document 22 past the read head 20. Each of the discrete analog signals outputted by the read head 20 is amplified by Amplifier 30 and transmitted over bus 32 to a plurality of A.D. Converters 34 which sample the analog signals at a 98 KHz. rate by clock signals received from the Clock Generator 36. The digitized signals are then transmitted over bus 38 to a Rectification unit 40 which outputs both positive and negative rectified signals over bus 44 to a Thresholding Logic unit 46 which applies fixed and dynamic threshold values to the digitized signals. The resulting threshold data is then transmitted over bus 48 to a Character Start logic unit 50 which examines the data to locate the start of the character read. The Character Start logic unit 50, upon finding a character start, will generate a signal over line 52 enabling the Thresholding logic unit 46 to examine the same data received over bus 44 and generate a dynamic threshold value based on the peak value of the analog signals received from the Rectification unit 40. The Thresholding Logic unit 46 will then apply the new dynamic threshold values to the digitized signals. The threshold data is then transmitted to the Character Start logic unit 50 which determines the final start of the character read from the data received together with the end of the character. These signals are transmitted over line 56 to the Image Extraction logic unit 58 for use in the operation of the logic unit.

The Image Extraction logic unit 58 examines every 7 bits of the analog signal received. If it finds a 0 bit surrounded by 1 bits, the logic unit 58 will fill in a 1 bit at that location and then determine if each of the 7 bits comprises an ink spot represented by a 1 bit or a blank spot represented by a 0 bit. The resulting reduced 14×10 bit map of the scanned character is transmitted over bus 62 to an Unfolding Logic unit 64 which examines the 14×10 bit map to locate the top row of the scanned character in its proper location within the bit map. Details of the logic circuits for generating the start and end of the character are fully disclosed in the previously-cited Nally et al., copending application, Ser. No. 331,946. The processed 14×10 bit map outputted by the Unfolding Logic unit 64 is transmitted over bus 66 to a Feature Matching Logic unit 68 which matches known character templates to the character represented by the bit map appearing on bus 66. The Feature Matching Logic unit 68 will generate signals over line 70 for storage in a Buffer Memory unit 72 representing the results of matching the template with the received character bit map produced. The data is then transmitted to a central processing unit (CPU) 74 for identifying the unknown character from the data received. Details of the construction of the Image Extraction Logic unit 58 and the Unfolding Logic unit 64 are disclosed in the previously-cited Nally et al. co-pending application, Ser. No. 331,936.

Referring to FIGS. 2A and 2B, there is shown tables disclosing the features of the character "2". A feature of a character is defined as a row of the bit map. A character feature set is a collection of distinctly different features which when assembled in the correct order, will produce a bit map containing the image of a character scanned. The number of features in a character feature set is a function of the complexity of the character. For example, only two features are required to completely describe the character "0".

| Feature Value | Feature # |
|---|---|
| 0011111111111 | 1 |
| 0011000000011 | 2 |

If feature 1 is placed in row 1 of the bit map, feature 2 in rows 2-6 and feature 1 again in row 7, a bit map for an ideal "0" result. By contrast, five features are required in the feature set of the character "6".

| Feature Value | Feature # | Row # |
| --- | --- | --- |
| 00001111111000 | 1 | 1 |
| 00001100011000 | 2 | 2 |
| 00001100000000 | 3 | 3 |
| 00001111111111 | 4 | 4,7 |
| 00001100000011 | 5 | 5,6 |

Similarly, a feature set has been defined for each character of the E-13B MICR font. Each feature set also contains an additional "blank feature" which is used to match the clear band on the bottom of the bit map (row 8 is usually blank).

Associated with each bit of a character feature is a weight value which represents the relative importance of the bit in the feature. The bit which forms a distinguishing part of the feature will have higher weights while bits that are unreliable (such as those at the edge of a bar) or less important have lower weights. For example, referring again to the features for the character "0", the bits in the string of feature 1 extending from bit #1 to bit #2 are all of roughly equal importance and hence are each assigned a weight of medium value. The cleared bit #13 is of low importance, since it is often set in the case of high ink intensity or wide bar and is generally not reliable. Hence, it is assigned a lower weight value. The trailing bit #14 is, on the other hand, very reliable and is consequently assigned a high weight value. In feature 2 of the character "0", the four set bits are important and each has a high weight value while the inner cleared bits will have a very high weight value since the interior clear area is a distinguishing feature of the character "0".

In situations where a bit value is always reliable and is also very important, a numerical weight is no longer assigned. Instead, the weight is termed a "logical". As will be described more fully hereinafter, logicals are treated differently in the feature matching procedure and have a major bearing on the outcome of the recognition process.

Figure 3A:
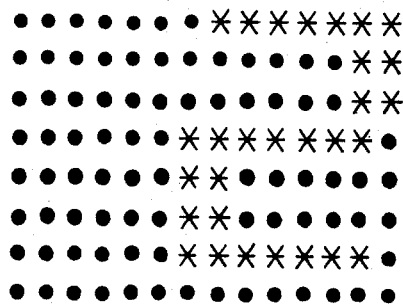
FIG. 3A is a schematic representation of the character "2" as printed on a document.
Figure 3B:
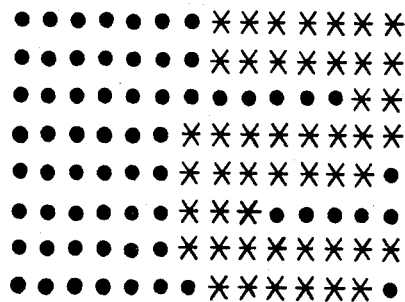
FIG. 3B is a schematic diagram showing a double image for the character "2"

Referring again to FIG. 2A, where there is shown a feature set for the character "2" together with the assigned weights, it is important to note that the actual values used for the weights are unimportant so long as the relationship between the weights of different values accurately reflect the relative importance of the data bits. The specific order in which a set of features is assembled to form a character bit map is the same order in which the feature set is applied to an unknown bit map during the recognition process. Ideally, all bit maps for a given character should be the same. This would reduce the row-feature allocation to a simple 1:1 correlation. Unfortunately, various print abberations such as ink intensity and bar width variations, skew, embossed encoding and the like, cause a considerable degree of variation in the bit maps. In addition, slight variations in the position of the MICR band as it passes the read head can cause some or all of the characters horizontal bars to be split evenly between two adjacent channels. This is characterized as doubling. FIG. 3A shows an example of a normal character image while FIG. 3B shows a double character image. While the overall dimensions of the characters remain the same, the exact row-feature allocation for each is different. Certainly, both characters are recognizable.

The net result of these conditions is that a 1:1 row-feature allocation is thus possible. It is a function of the "rules" for each character to allow for this type of image variation while maintaining the integrity of the overall character definition. In most cases, more than one feature is allowed in any one row of the bit map. It is up to the feature matching apparatus to select the best match.

Figure 4A:
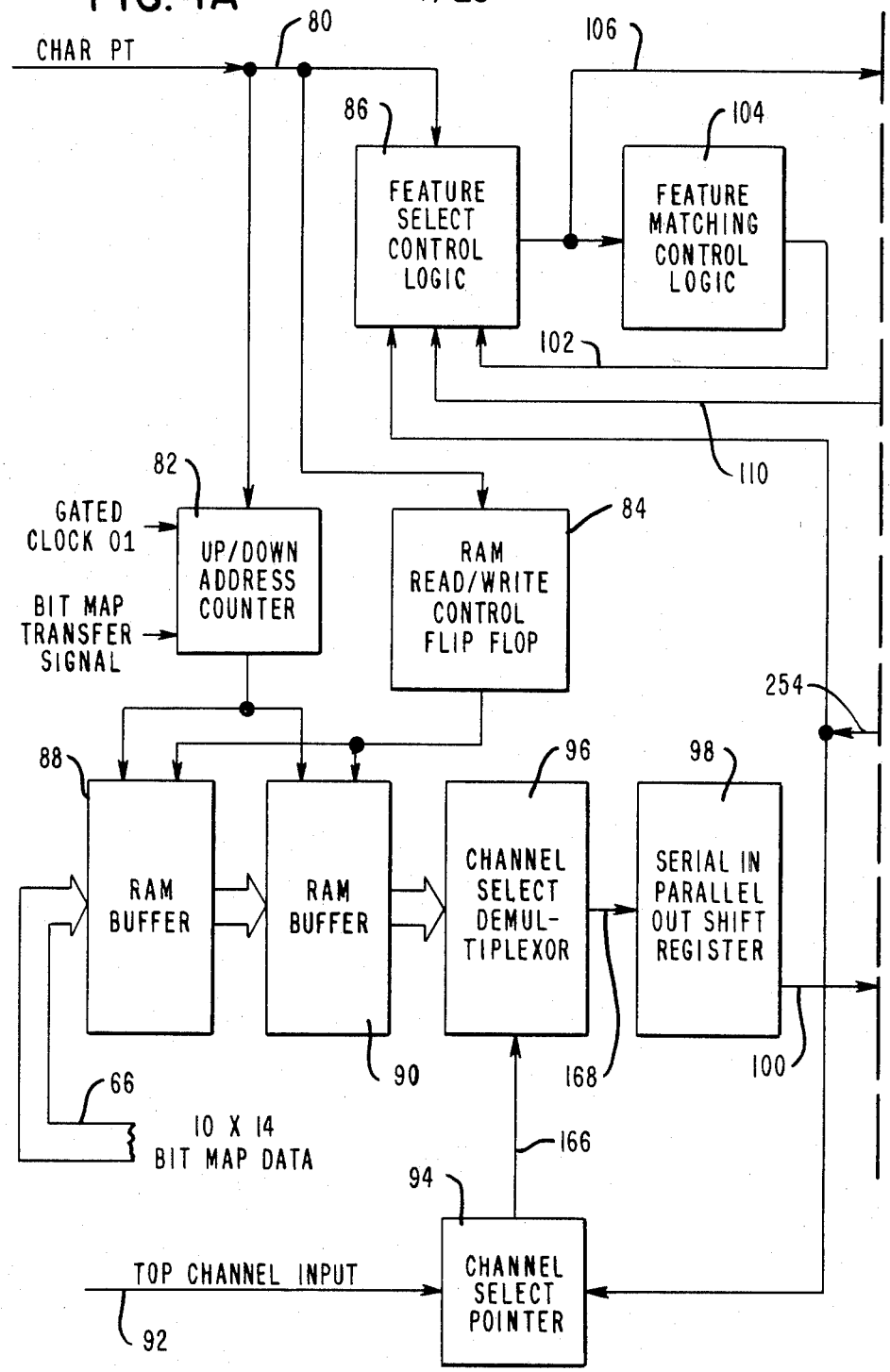
FIGS. 4A and 4B, taken together, comprise a block diagram of the circuits for matching the features of the unknown character with the features of the known character.
Figure 4B:
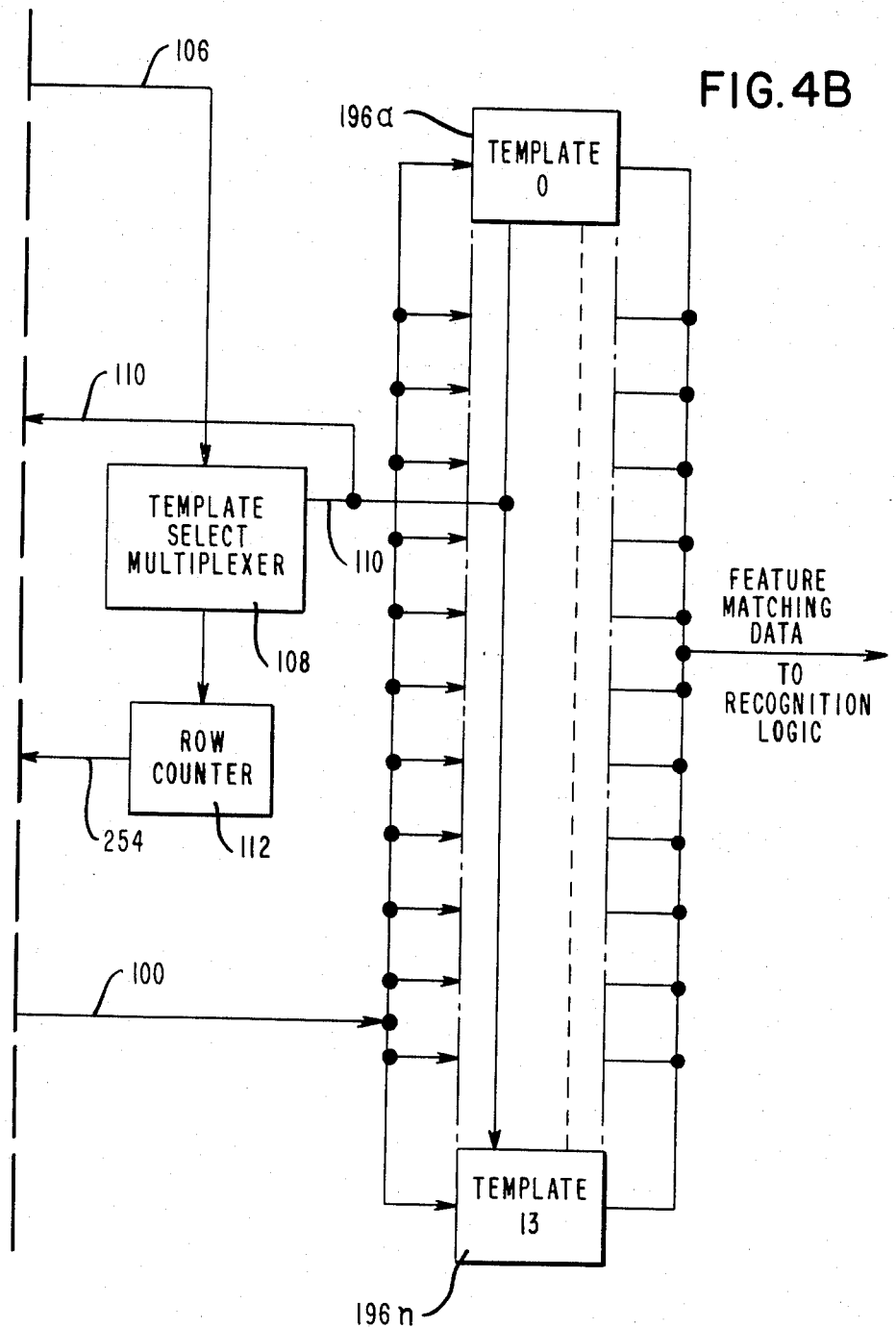

Referring now to FIGS. 4A and 4B, there is shown a block diagram of the Feature Matching Logic unit 68 (FIG. 1). The Unfolding Logic unit 64 (FIG. 1) outputs a character present signal CHAR PT over line 80 which is inputted into an Up/Down Address Counter unit 82, a RAM Read/Write Control Flip-Flop unit 84 and a Feature Select Control Logic unit 86. In response to receiving the signal CHAR PT, the Address Counter unit 82 will generate address signals to a pair of RAM Buffer units 88 and 90, enabling the 14×10 bit map data appearing on bus 66 to be stored in the Buffer unit 88. The data is shifted from the Buffer unit 88 to the second Buffer unit 90 under the control of Flip-Flop unit 84. Data identifying the location of the top row of the character appears on line 92 and is inputted into a Channel Select Pointer counter 94 whose output count signals represent the channel or row number that is being inputted into a Channel Select Demultiplexer 96 from the Buffer unit 90. The Demultiplexer 96 outputs the top row of the data bit map being outputted by the Buffer unit 90 over line 168 to a Serial-In Parallel-Out Shift Register unit 98. The data bits of the selected row are then outputted over line 100 to the fourteen feature Template table look-up members 196a-196n inclusive (FIG. 4B), in which each bit location in each row of the unknown character is compared with a corresponding Template disclosing the bit location in each row of 14 known characters.

The Feature Select Control Logic unit 86 will output features which are required of the rows of data bits being examined in order to conform to the known character in each of the Template look-up tables 196a-196n inclusive. These features are outputted to a Feature Matching Control Logic unit 104 (FIG. 4A) which outputs control signals over line 102 to the Feature Select Control Logic unit 86 enabling such logic unit 86 to output control signals over line 106 to a Template Select Multiplexer 108 (FIG. 4B). The Multiplexer 108 will output over line 110 control signals selecting the Template to be matched with the row of data appearing on line 100. A Row Counter 112 (FIG. 4B) counts the rows of data bits matched with the Template look-up tables 196a-196n for controlling the operation of the Feature Select Control Logic unit 86 (FIG. 4A).

Figure 19:
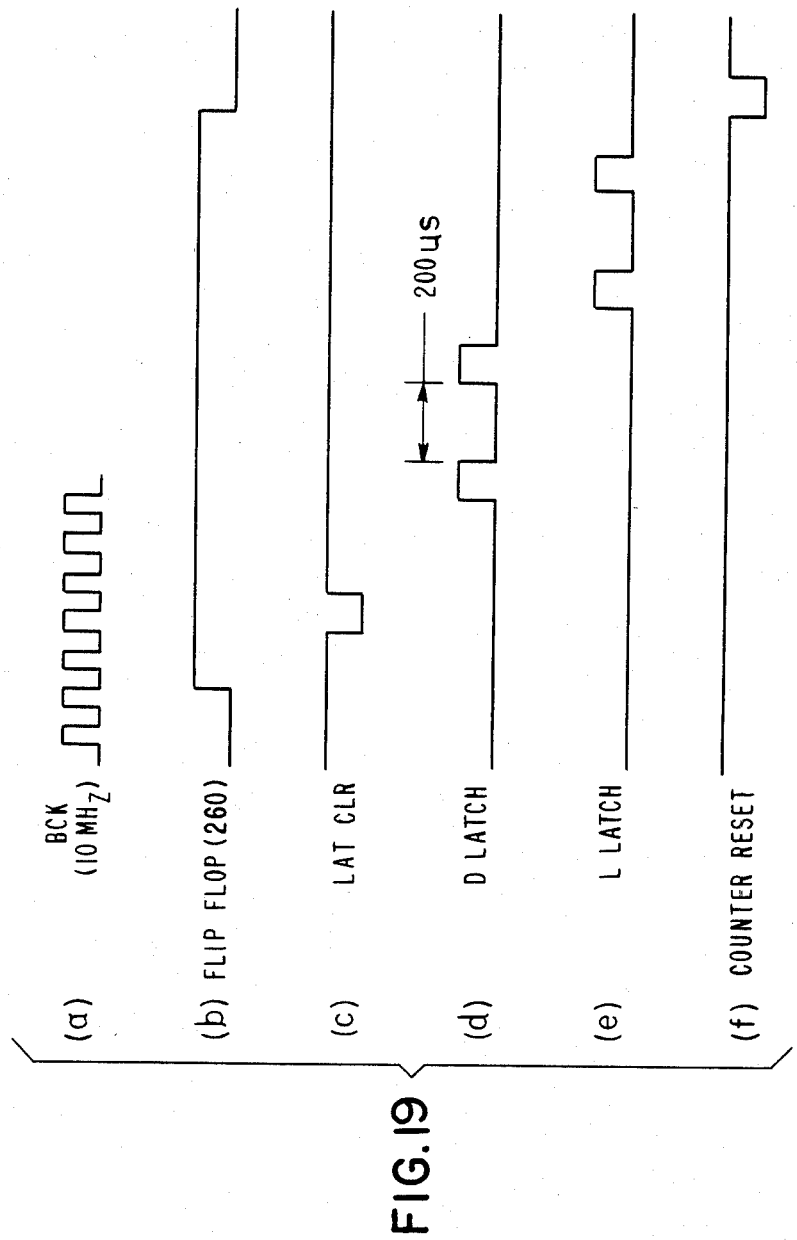
FIG. 19 is a diagram showing various waveforms used in matching the data generated by the reading of an unknown character with the templates of known characters.

Referring now to FIGS. 5A-5E inclusive, there is shown logic circuits of the Counter and Flip-Flop units 82 and 84 (FIG. 4A) together with the Buffer units 88, 90 and the Register unit 98 for shifting the bit map into the Template members 196a-196n. Included in the Control Flip-Flop unit 84 is a 74LS74 flip-flop 114 (FIG. 5A) which is clocked by the inverted feature start signal BFSTR appearing on line 80, which is inverted by the inverter 116 and transmitted over line 117 to the clock input of the flip-flop 114. The clocking of the flip-flop 114 results in a high signal appearing on its Q output line 118 which is inputted into the J input of a 74LS112 flip-flop 120. The flip-flop 120 is clocked by the 10 MHz. clock signals BCK (FIG. 19a) appearing on line 122 from a clock generator (not shown) and inverted by the inverter 124 for transmission over line 127. The clocking of the flip-flop 120 outputs a high signal over its Q output line 126 to an input of a NAND gate 128

(FIG. 5B) which receives the clock signals BCK over line 127. The NAND gate 128 will output a gated clock signal to the DC input of the 74LS193 Up/Down Address Counter 82 (see also FIG. 4A).

Figure 5A:
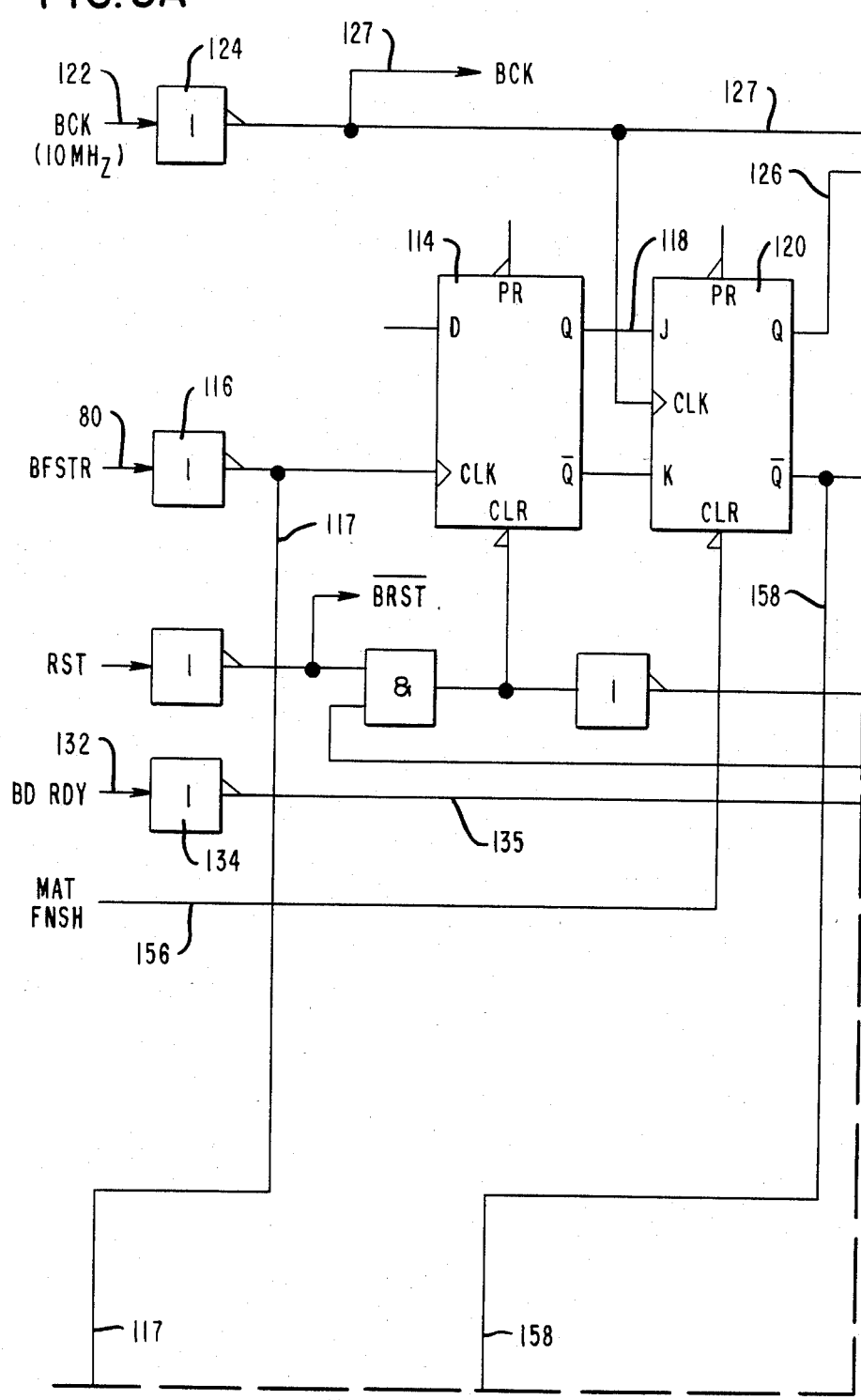
FIGS. 5A-5E inclusive, taken together, form logic circuits showing the up/down address counter, the RAM buffers and the RAM read/write control circuit of FIG. 4A.

The Counter 82 receives a buffer data ready signal BDRDY over line 135 which is received over line 132 and inverted by the inverter 134 (FIG. 5A). The signal is inputted into the UC input of the Counter 82 for incrementing the counter by one count. The clocking of the flip-flop 114 (FIG. 5A) by the feature start signal BFSTR going high results in the Counter 82 starting to count in an upward direction. The output count of the Counter 82 appears on lines 136 and is inputted into a 74LS244 buffer member 138 which outputs the count over lines 140 to a plurality of 74LS189 RAM memory units 142–146 inclusive (FIG. 5C) comprising the RAM Buffer unit 90 (FIG. 4A) as the address for storing the character bit map therein. The output count signals appearing on lines 136 are also inputted into a plurality of 74LS189 RAM memory units 148-152 inclusive (FIG. 5C) comprising the RAM Buffer unit 88 (FIG. 4A) as the address of the storage location of the character bit map appearing on lines 154 which are part of the data bus 66 (FIG. 4A).

The output signals of the Address Counter 82 appearing on lines 136 will write the 14×10 bit map appearing on bus 66 into the memory units 148-152 inclusive in accordance with the level of the feature start signal BFSTR appearing on line 117. Upon reaching a count of 14 which is the width of a character bit map, the flip-flop 120 is reset by the generation of the match finish signal MATFNSH appearing on line 156. The resetting of the flip-flop 120 results in a high signal being outputted over line 126 to the NAND gate 128 enabling the clock signals BCK appearing on line 127 to down count the Counter 82. The output count of the Counter 82 (FIG. 5B) will be outputted by the buffer member 138 over lines 140 to the memory units 142-146 inclusive (FIG. 5C) which are enabled at this time by the low signal appearing on the $\overline{Q}$ output line 158 of the flip-flop 120. The memory units 142-146 inclusive will write in the data bits of the data bit map outputted over lines 160 from the memory units 148-152 inclusive (FIG. 5C) which in turn are enabled by the high signal appearing on line 117 at an address in the memory units 142-146 inclusive in accordance with the output count of the Counter 82.

The data bits stored in the memory units 142-146 inclusive are outputted over lines 162 to the Demultiplexer unit 96 (FIG. 4A) comprising a 74LS150 decoder 164 (FIG. 5D) which, upon receiving data bits over lines 166 from the Channel Select Pointer unit 94 (FIG. 4A) identifying the top row of the character being scanned, results in the top row of data bits being outputted serially over line 168, through the inverter 170 (FIG. 5B), the AND gate 172 and over line 174 to a 74LS164 series-in-parallel-out shift register 176 (FIG. 5D) located in the Register unit 98 (FIG. 4A). The shift register 176 is clocked by the generation of the feature shift signals FEATSH appearing on line 178 to shift the first 7 bits of each row over line 180 to a second 74LS164 serial-in-parallel-out shift register 182. Thus, the first 7 bits of each row will appear on the parallel output lines 184 of the register 182 while the last 7 bits will appear on the parallel output lines 186 of the 74LS164 register member 176 (FIG. 5D). The 14 data bits are then applied to buffer members 188 and 190 (FIG. 5E) under the control of the signal IMLATCH appearing on line 230. The buffer members 188 and 190 are sequentially enabled by the signal U/L appearing on lines 192 selecting either the upper or lower 7 data bits, the signal U/L being inverted by the inverter 194 to output over lines 100 7 bits of each row of the data bit map to the plurality of 2732a EPROM Template look-up table members 196a–196n inclusive (FIGS. 4B, 11-13, 12-14 and 15-17) in which are stored the templates for the known fourteen characters. The EPROM Template members 196a–196n inclusive will compare each row of data bits received with the corresponding row in the stored templates to generate information for use in identifying the unknown characters in a manner that will be explained more fully hereinafter. Each row of data bits are clocked out of the buffer members 188 and 190 by the clock signal IMLATCH appearing on line 232 (FIG. 5E). As will be described more fully hereinafter, during the first matching operation of the Template look-up tables 196a–196n inclusive, the signal IMLATCH will clock the first 13 data bits of each row into the buffer members 188 and 190 from which they are inputted tables 196a–196n inclusive. After 13 data bits have been clocked out, the signal IMLATCH will be disabled. After the first matching operation has occurred, the signal IMLATCH will again be enabled to clock out the last data bit of each row. The look-up tables 196a–196n will perform a second matching operation on the 14 data bits in each row.

The AND gate 172 (FIG. 5B) is enabled by a high signal appearing on line 198 and outputted by the NOR gate 200 which receives input signals over lines 202 and 204 from a 74LS85 comparator member 206. The comparator member 206 compares the output count of the Counter 82 with the output count of a second counter 208 (FIG. 7A) whose operation records the number of data bits being shifted into the register members 176 and 182 (FIG. 5D). The output count of the counter 206 appears on line 210 while the output count of the Address Counter 82 is outputted from a 74LS174 latch member 212 which has latched the output count of the Counter 82 appearing on lines 136.

Referring now to FIGS. 7A–7D inclusive, there is disclosed the logic circuits of the Feature Select Control Logic unit 86 (FIG. 4A) and the Feature Matching Control Logic unit 104. Included in the Logic unit 86 is the 74LS393 counter 208 (FIG. 7A) which is clocked by the 10 MHz. bit clock signals BCK appearing on line 127 and transmitted through an AND gate 214, over line 178 as the feature shift signal FEATSH and through the inverter 216 to the clock input of the counter 208. The AND gate 214 is enabled by the clocking of a flip-flop 218 which receives the new row signal NROW over line 220 transmitted through the AND gate 223 by a timing signal appearing on line 222. The output count of the counter 208 controls the shifting of each row of data bits between the memory units 148-152 inclusive (FIG. 5C) and the register members 176 and 182 (FIG. 5D). The count of the counter 208 is outputted over lines 224 to a 74LS244 buffer member 226 which outputs the count over lines 210 to the comparator 206 (FIG. 5B) which compares the output count of the Address Counter 82 (FIG. 5B) and 208 (FIG. 7A), the latter of which enables the AND gate 172 (FIG. 5B) to output a selected row of data bits from the decoder 164 (FIG. 5D) to the shift register 176 in the manner described previously. On the generation of the 13th count, an AND gate 228 (FIG. 7A) is enabled to clock a 74LS74 flip-flop 230 (FIG. 7B) which outputs the high image latch signal IMLATCH over line 232. As previously described, this signal enables the first thirteen data bits of each row to be transferred from the register members 176 and 182 (FIG. 5D) to the buffer members 188 and 190 (FIG. 5E).

Further included in the Feature Select Control Logic unit 86 (FIG. 4A) is a 74LS163 counter 234 (FIG. 7C) whose output count selects certain features which must be met when comparing the row of data bits with the template stored in the table look-up members 196a–196n inclusive. The counter 234 is enabled by the clocking of a flip-flop 236 (FIG. 7B) upon the output count of the counter 208 (FIG. 7A) reaching the count of 14. This latter count enables an AND gate 238 (FIG. 7A) to output a positive going pulse over line 239 which is inverted by the inverter 240 and transmitted to the clock input of the flip-flop 236 over line 242. The clocking of the flip-flop 236 results in a high signal being outputted over line 237 enabling the operation of the counter 234. The output count of the counter 234 represents the row of data bits being outputted over lines 100 (FIG. 5E). The output count of the counter 234 (FIG. 7C) is transmitted over lines 244 to a 74LS151 decoder member 246 in which features of a character are presented on the input lines 248. The output signal of the counter 234 appearing on line 245 will clock a flip-flop 247 after being inverted by the inverter 249. The flip-flop 247 will output the feature mark signal FMK over line 251 used in notifying the CPU 74 of the presence of a feature.

Associated with the decoder 246 is an 82S115 EPROM member 250 (FIG. 7C) located in the Feature Matching Control Logic unit 104 (FIG. 4A) which receives over the input lines 252 data representing the character number and over lines 254 data representing the row number to be processed at this time. The EPROM member 250 in response to receiving these input signals will output over each of the output lines 248 signals indicating whether there is a feature required to be in that row. As each count of the counter 234 is inputted into the decoder 246, the decoder will select one of the input lines 248 connected to the EPROM member 250. If a feature is present which is required to be found in the row of data, a high signal will be present on the selected line 248. If not, a low signal is present which disables a matching operation and allows the next row of data to be matched. If the input signal is high, a high signal will appear on the output line 256 of the decoder member 246 which is transmitted through the NOR gate 258 and line 259 to the D input of a 74LS74 flip-flop 260 (FIG. 7D) initiating a matching operation.

Upon the clocking of the flip-flop 260 by the clock signals BCK (FIG. 19a) appearing on line 127 and inverted by the inverter 262 (FIG. 7C), the high Q output signal (FIG. 19b) appearing on line 264 of the flip-flop 260 (FIG. 7D) will enable a 74LS163 counter 266 to output a count over lines 192 to a 74LS154 multiplexer 270. The multiplexer will output the following signals: latch clear (LATCLR) (FIG. 19c) over line 272, distance latch (D LATCH) (FIG. 19d) over line 274, logical latch (LLATCH) over line 276 and a low signal over line 278. The signal U/L appearing on the line 192 (FIG. 7D) enables the operation of the buffers 180 and 190 (FIG. 5E) to output the first 7 bits of the row (upper) or the last 7 bits (lower). The signal D/L appearing on line 193 identifies the comparison operation as either distance (D) or logical (L). These signals are inputted into the Template look-up tables 196a–196n (FIGS. 4B, 11–13 and 15–17 inclusive). The low signal appearing on the output line 278 of the multiplexer member 270 clears the flip-flop 260 when transmitted through the AND gate 280 which is enabled by the system reset signal $\overline{BRST}$ appearing on line 282 (FIG. 7D).

Figure 9A:
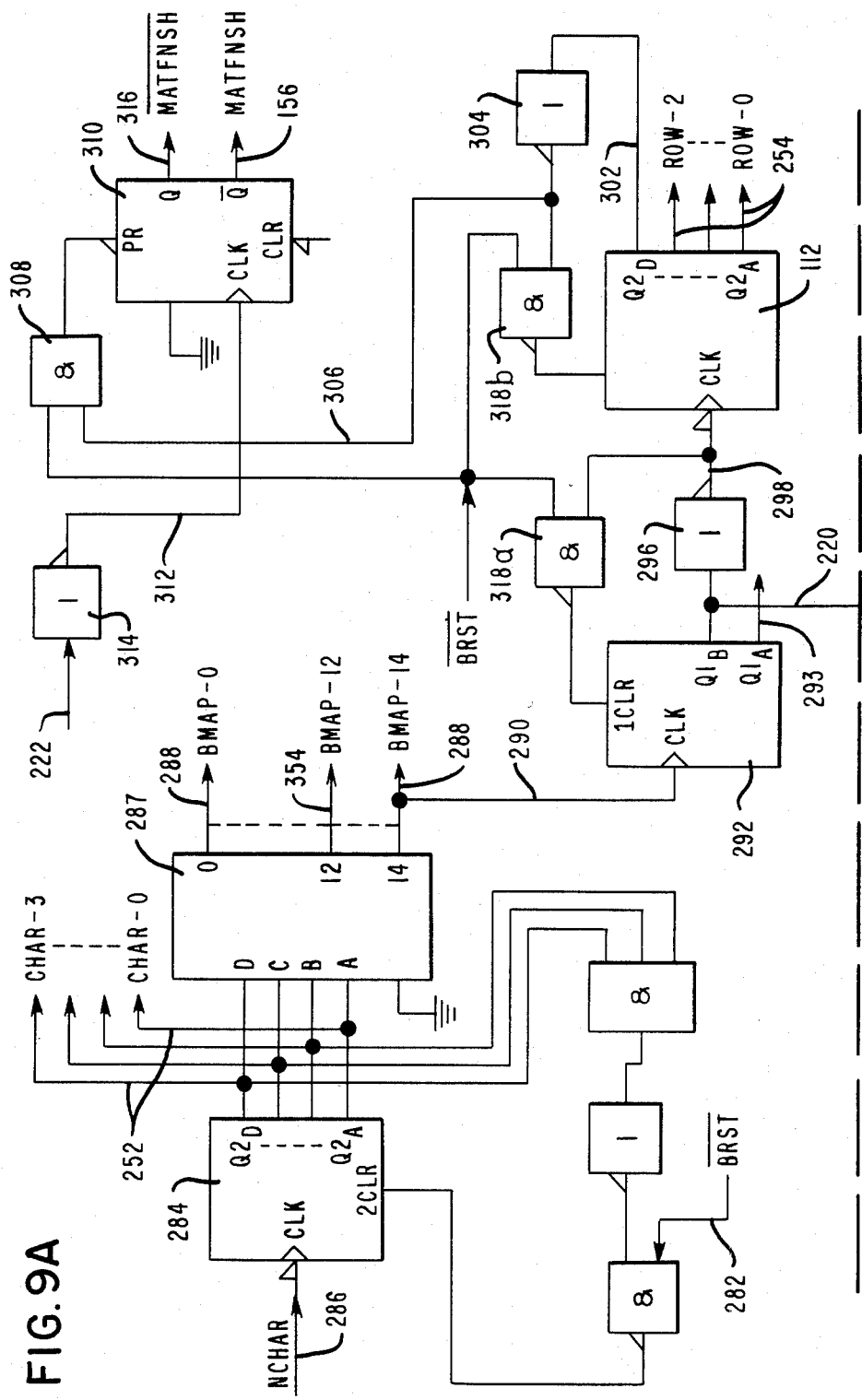
FIGS. 9A and 9B, taken together, disclose the logic circuits for the template select multiplexer unit and the row counter unit of FIG. 4B.
Figure 9B:
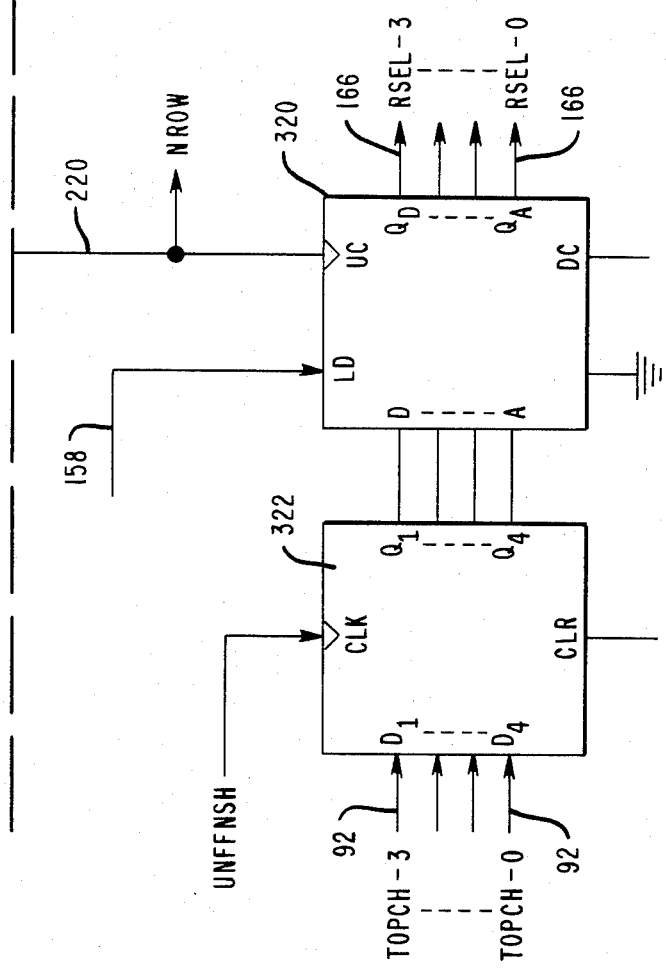
Figure 10:
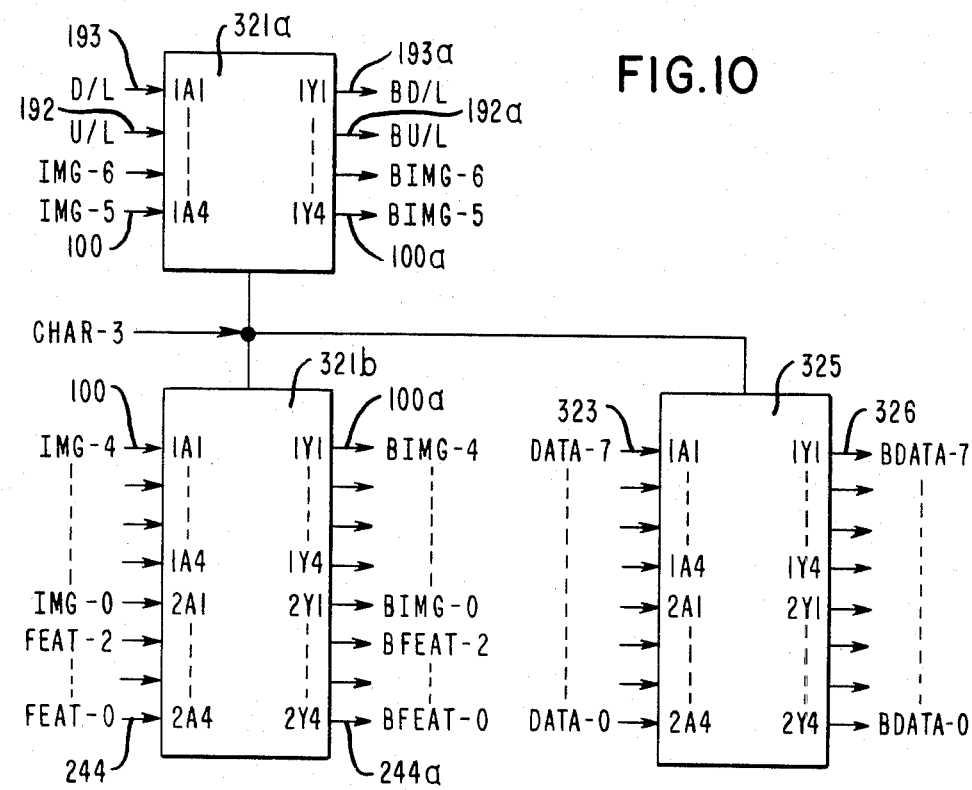
FIG. 10 is a diagram of the logic circuits associated with the template matching units of FIG. 4B.
Figure 11:
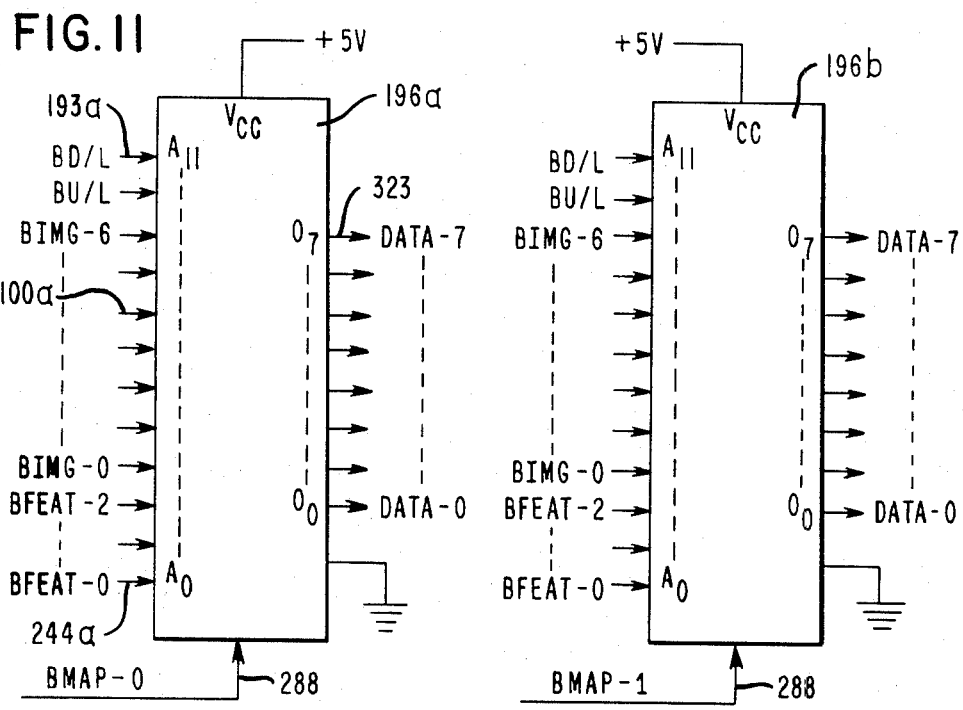
FIGS. 11-13 inclusive are diagrams of the logic circuits used in the template matching units of FIG. 4B.
Figure 12:
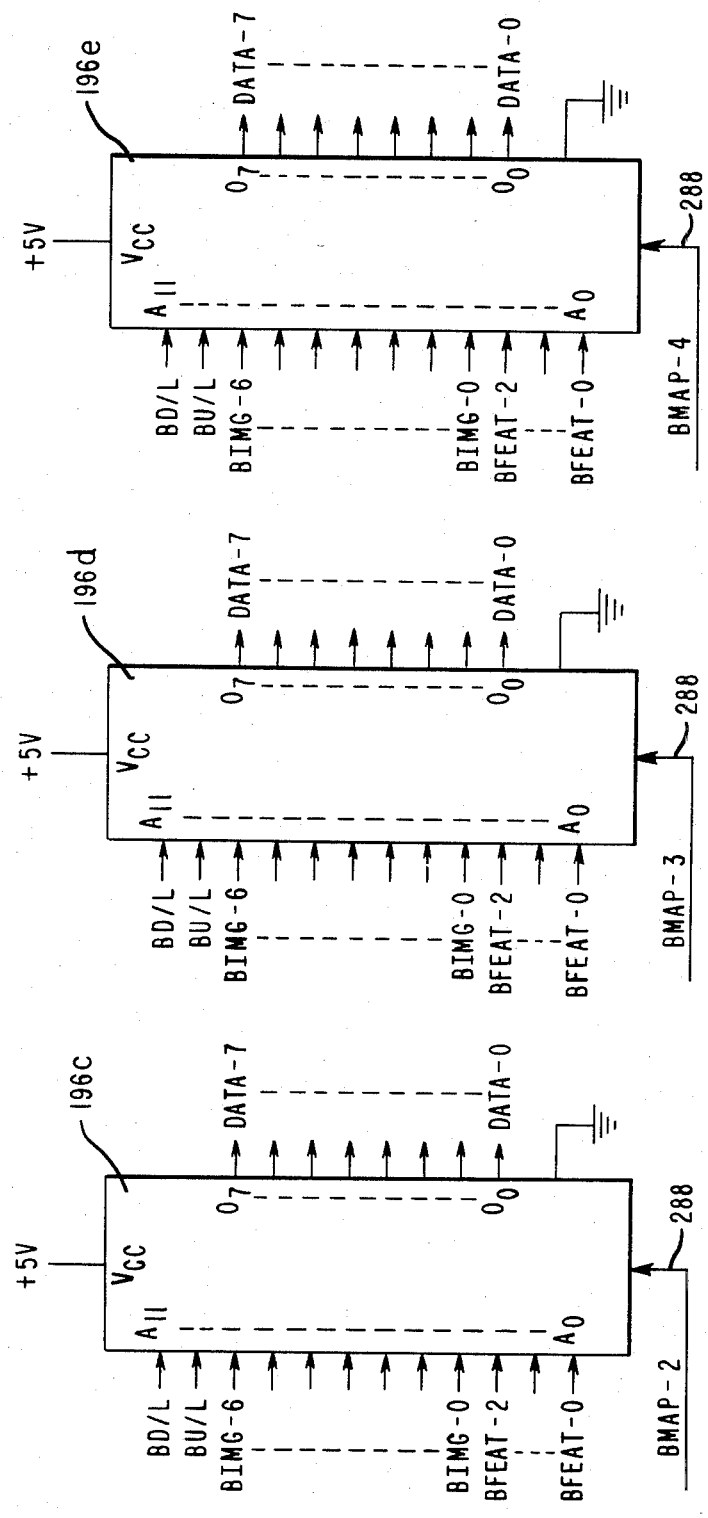
Figure 13:
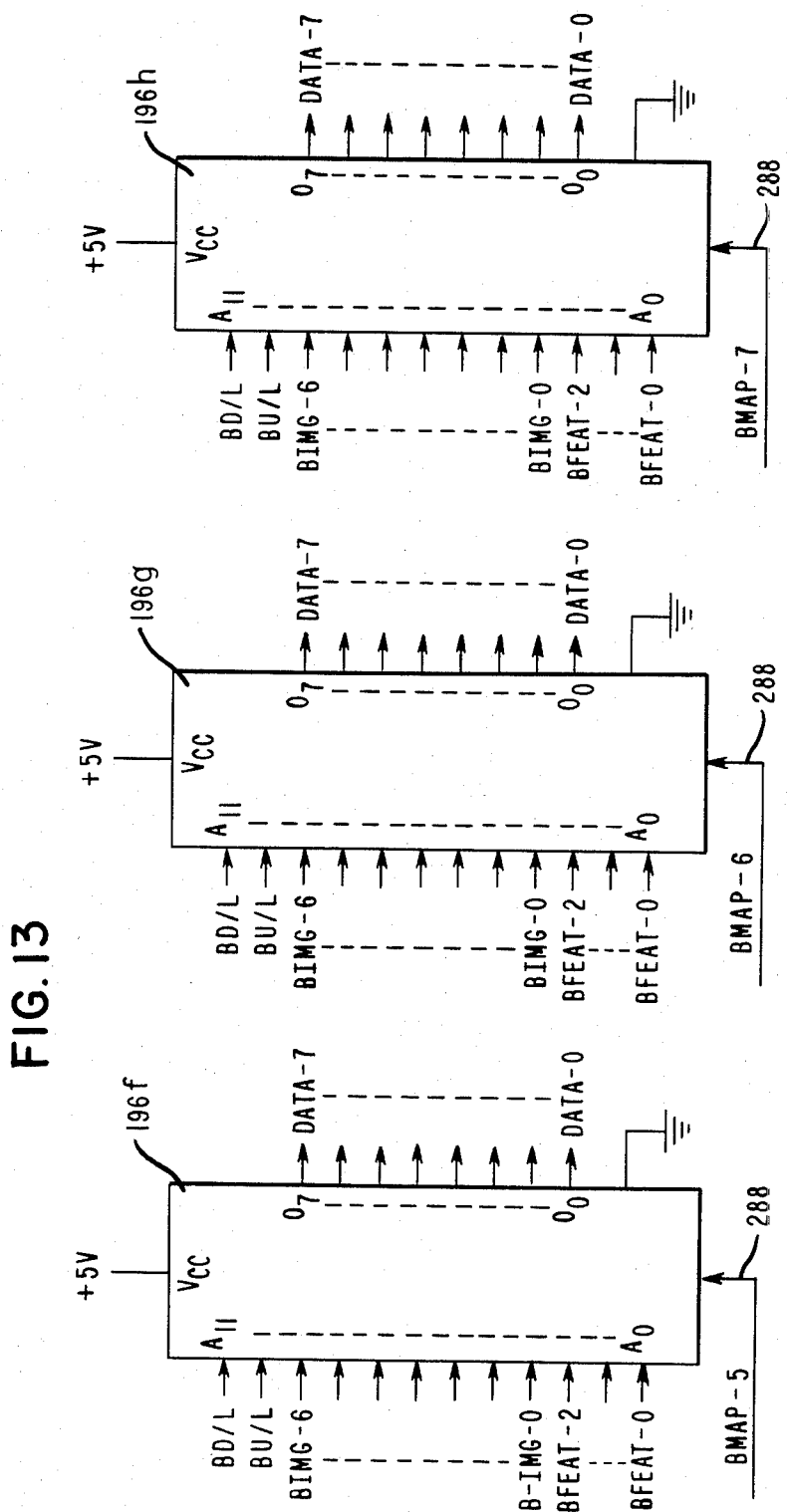
Figure 14:
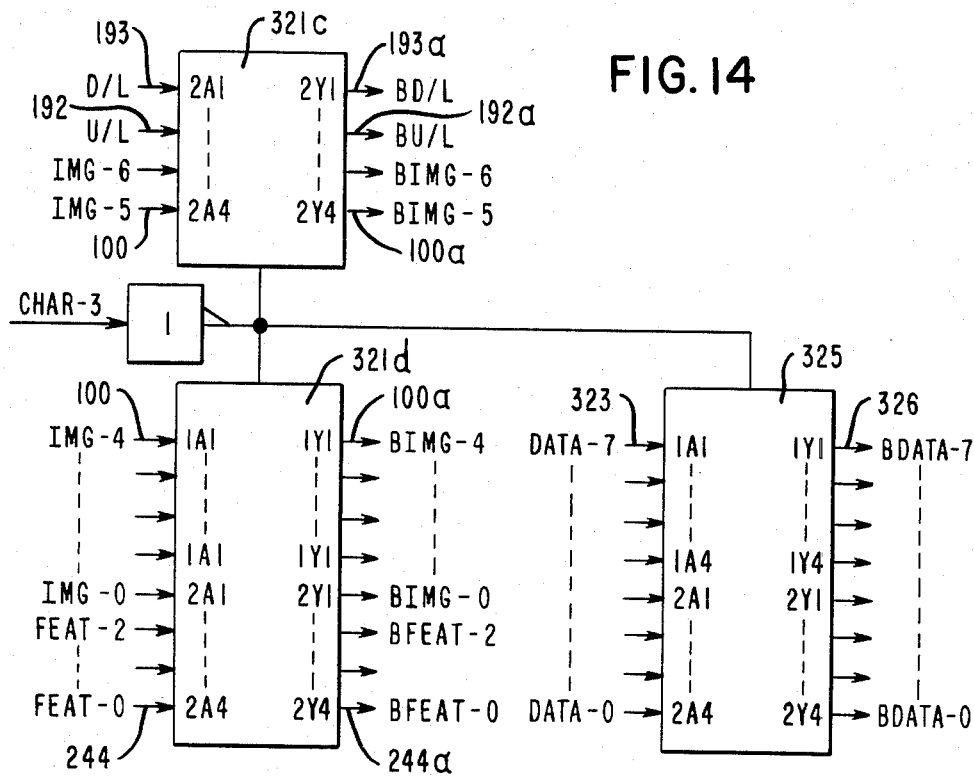
FIG. 14 is a diagram of the logic circuits associated with the template matching units of FIG. 4B.
Figure 15:
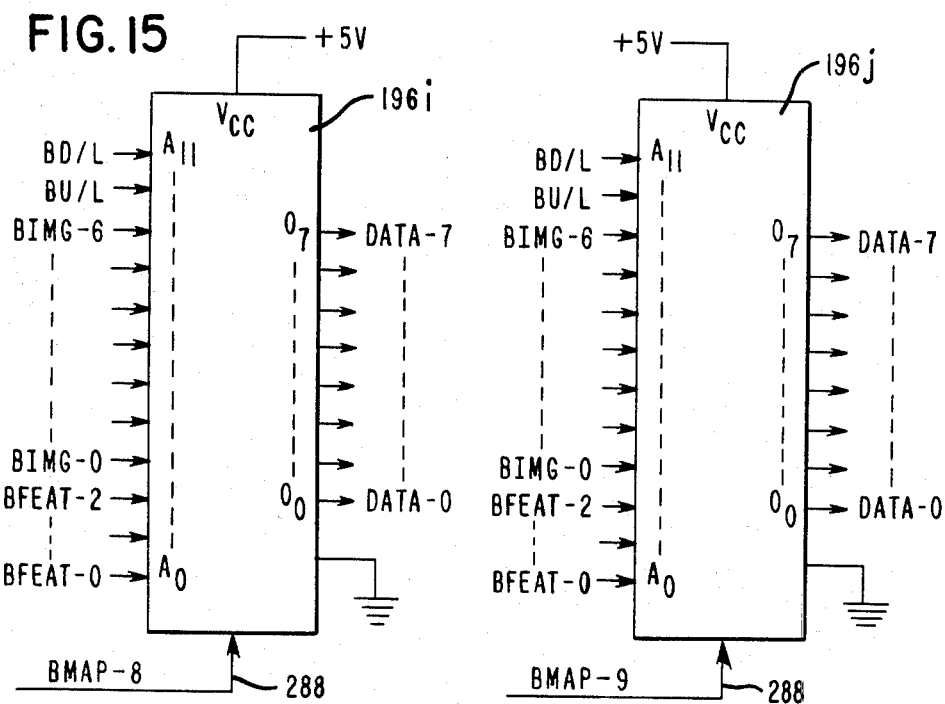

Referring now to FIGS. 9A and 9B, there is shown the Template Select Multiplexer logic circuit 108 (FIG. 4B) for selecting the templates to be compared together with the Row Counter unit 112 (FIG. 4B) and the Channel Select unit 94 (FIG. 4A). The Multiplexer circuit 108 includes a 74LS393 counter 284 (FIG. 9A) clocked by the new character signal NCHAR going high over line 286 indicating that a new character is being processed. The output count of the counter 284 representing the known character being processed will appear on the output lines 252 for transmission to the EPROM member 250 (FIG. 7C) for use in selecting the feature which is to be found on the row of data bits being examined. The output count is also inputted over lines 252 to a 74LS154 multiplexer unit 287 which will sequentially drive a low signal over each of its output lines 288 enabling each of the Template EPROM look-up table members 196a–196n inclusive (FIGS. 11–13 and 15–17 inclusive) to compare each row of data bits received with the corresponding row in the templates of the known characters.

Upon the counter 284 reaching a count of 14 indicating that the matching of the row has been completed, a negative to positive transition appearing on line 290 will increment a 74LS393 counter 292 (FIG. 9A) which outputs the new row signal NROW over line 220 for each row of the bit map being processed. This signal is inverted by the inverter 296 and is then transmitted over line 298 to the clock input of the 74LS393 Row Counter 112 (FIGS. 4B and 9A). The output count of the Counter 112 represents the row of data bits being processed and is transmitted over line 254 to the EPROM member 250 (FIG. 7C) for use in the selection of the feature to be compared. The signal on the output line 302 of the counter 112 is inverted by the inverter 304 and transmitted over line 306 to a AND gate 308 whose output signal will preset a 74LS74 flip-flop 310. The flip-flop 310 is also clocked by the timing signal appearing on line 222 and transmitted over line 312 from the inverter 314. The clocking of the flip-flop 310 will output the inverted match finish signal $\overline{MATFNSH}$ over line 316 together with the match finish signal MATFNSH over line 156, the latter signal clearing the flip-flop 120 (FIG. 5A) initiating the start of matching of another character. Both the counters 292 and 112 are reset after reaching a count of 14 in response to the signals appearing on the output lines 298 and 302 respectively, which are transmitted through the AND gates 318a and 318b.

The output signal from the counter 292 (FIG. 9A) appearing on line 220 (FIGS. 9A and 9B) is also inputted into a 74LS192 counter 320 (FIG. 9B) located in the Channel Select Pointer circuit 94 (FIG. 4A) whose output count appearing on the output lines 166 are inputted into the decoder 164 (FIG. 5D) for use in selecting the features required of the row of data bits being examined. The counter 320 is preloaded with data bits identifying the top channel of the character data bit map which data bits are outputted from a 74LS174 dual flip-flop member 322 which in turn has received the data bits over the lines 92 from the Unfolding Logic unit 64 (FIG. 1).

Referring now to FIGS. 10 and 14 and 18A and 18B inclusive, there is shown the logic circuits for accumulating the distances and the logicals found as the result of the template matching. The row of data bits appearing on the output lines of the buffers 188 and 190 (FIG. 5E) are inputted into buffers 321a–321d inclusive (FIGS. 10 and 14) together with the signal D/L, U/L and the signals FEAT-0-FEAT-2 (FIG. 7C) identifying the feature to be matched. The buffers 321a–321d inclusive will output the same signals at an increased signal strength and transmit the signals to each of the look-up tables 196a–196n (FIGS. 11–13 and 15–17 inclusive). Taking the look-up table 196a (FIG. 11) as a typical example of the signals generated as a result of the operation of the table, the signals BIMG 0–6 inclusive in each row of the unknown character are outputted over lines 100a of the buffers 321a–321d inclusive (FIGS. 10 and 14) and inputted into each of the look-up tables 196a–196n inclusive which in turn are sequentially enabled by the signal appearing on line 288 of the muxtiplexor unit 287 (FIG. 9A). Also inputted into the tables are the feature signals BFEAT 0–2 inclusive. The look-up tables 196a–196n inclusive will compare each row of signals with the features that are allowed to occur in that row. The tables will output over lines 323 (FIG. 11) the data bits DATA 0–7 inclusive with the data bits DATA 0–3 inclusive identifying the number of logical violations while the data bits DATA 4–7 inclusive represent data characterized as a "distance" which reflects the differences between the weighted values of the bit positions in the row of data bits when compared with the templates in the tables 196a–196n.

The data signals DATA 0–7 inclusive are inputted into the buffers 325 (FIGS. 10 and 14) which increase the signal strength of the signal and output the signals over line 326 into a pair of 74LS283 accumulators 328 and 330 (FIG. 18A) which will accumulate the total distances outputted from the look-up tables 196a–196n inclusive as a result of a template matching operation. These signals are transmitted over lines 332 to a 74LS273 latch member 334 which latches the output of accumulators 328 and 330 upon the generation of the signal DLATCH (FIG. 19d) over line 274. The input lines 326 are also coupled to a 74LS283 accumulator member 336 (FIG. 18B) which outputs the total logicals violation into a 74LS273 latch member 338 over lines 340. The latch member 338 also receives over lines 244 the signals FEAT 0–2 inclusive identifying the feature being matched by the table and the signal FMK (FIG. 7C) appearing on line 251. The latch member 338 is controlled by the signals LLATCH appearing on line 276. Both the latches 334 and 338 are cleared by the signal LAT CLR appearing on line 272 at the start of each matching operation. The values representing the total distances and the total logicals for each template are inputted over lines 342 and 332 into a pair of 74LS244 buffers 346 and 348 with the buffer 346 outputting the total logical violations over lines 350 to the central processing unit 74 (FIG. 1) while the buffer 348 outputs the total distance over line 352.

Figure 5B:
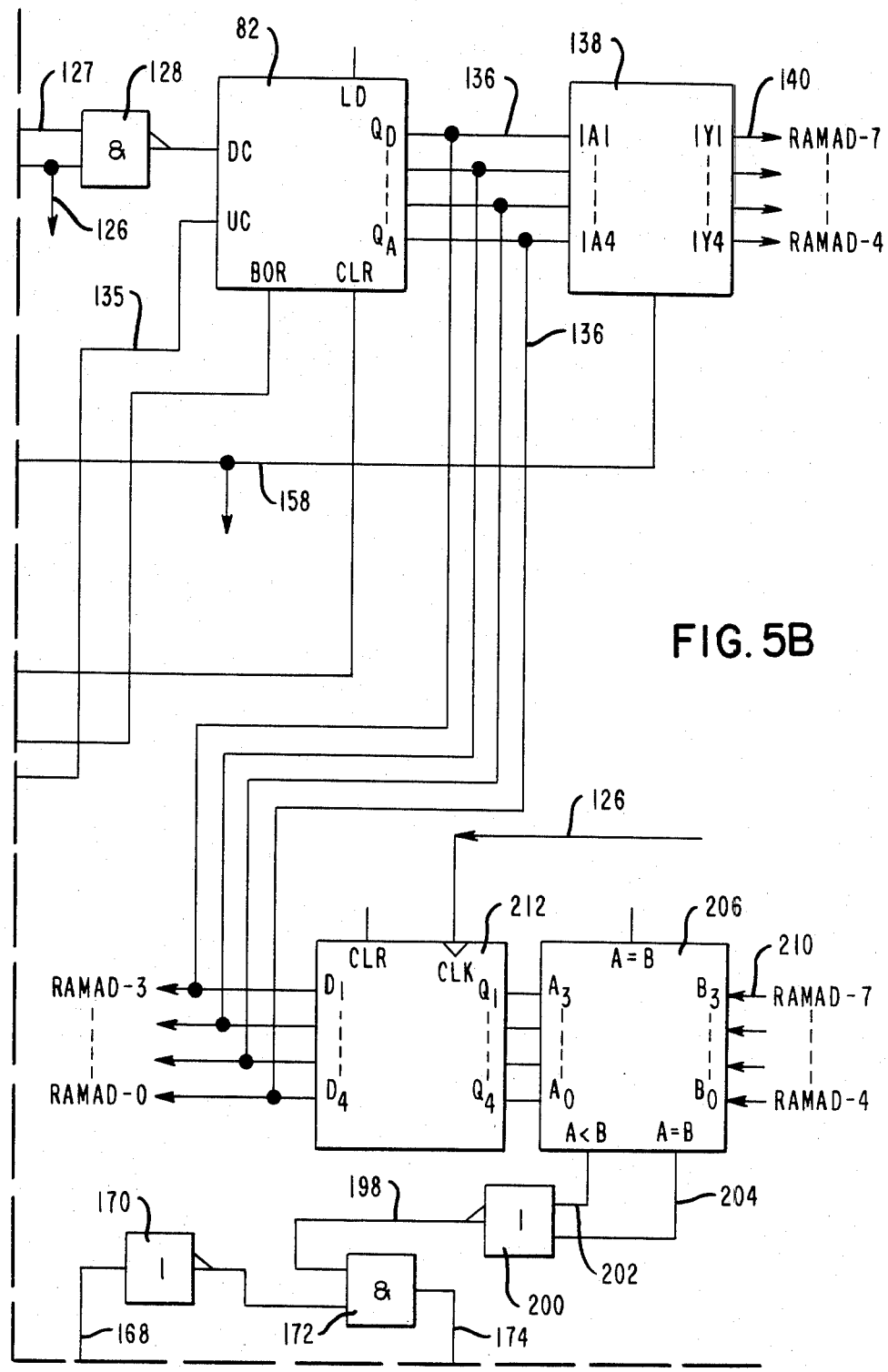
Figure 5C:
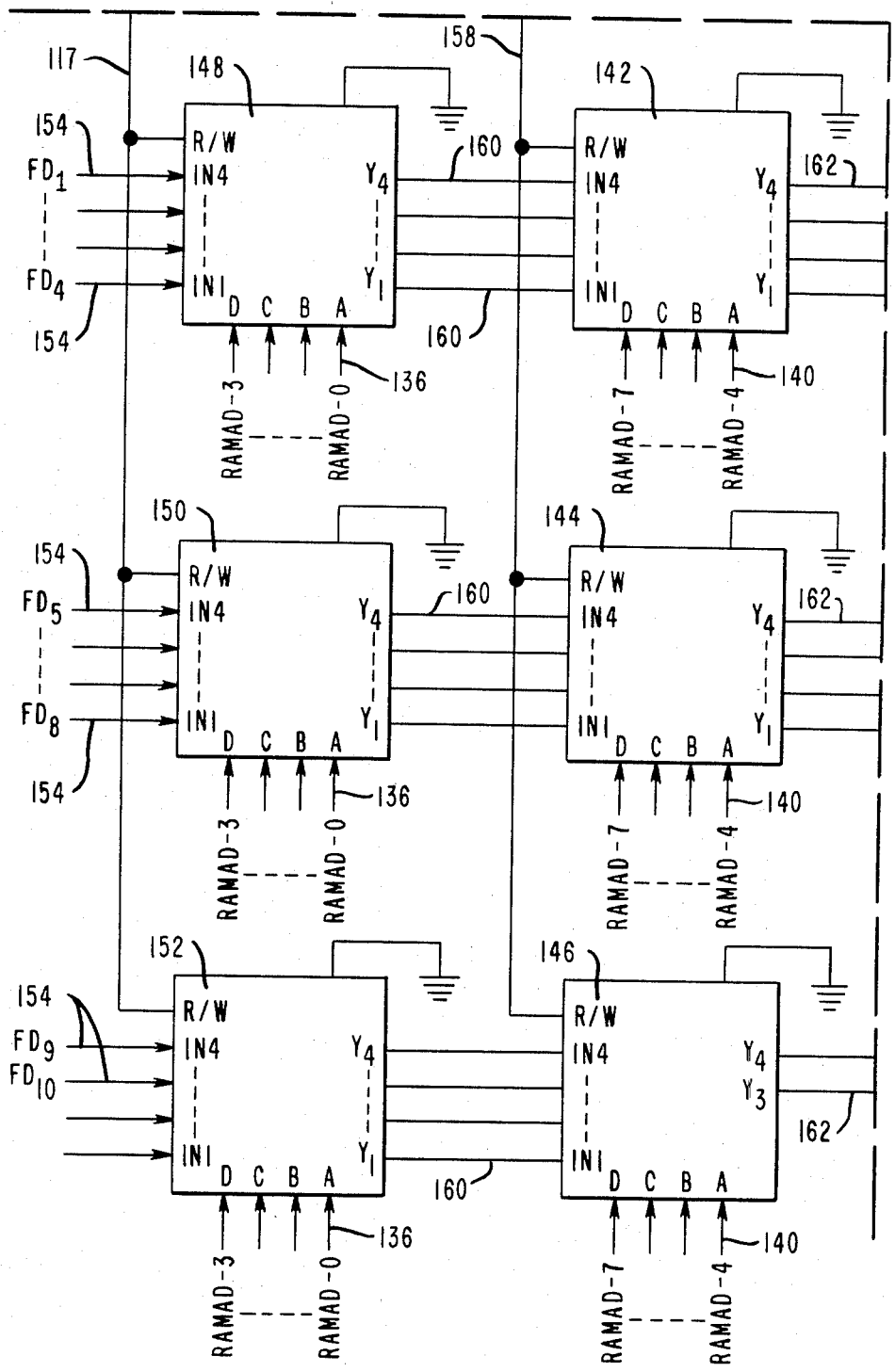
Figure 5D:
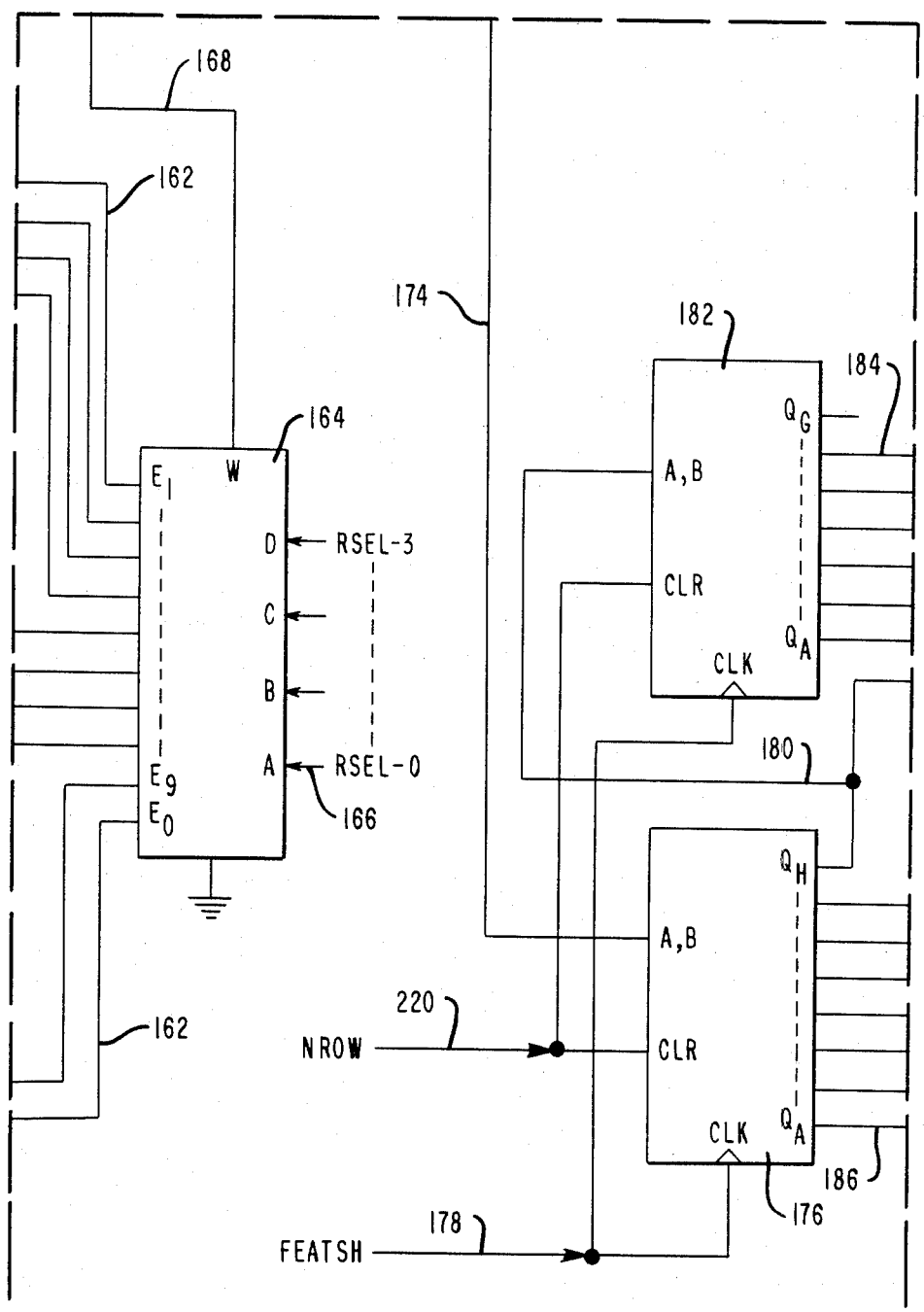
Figure 6:
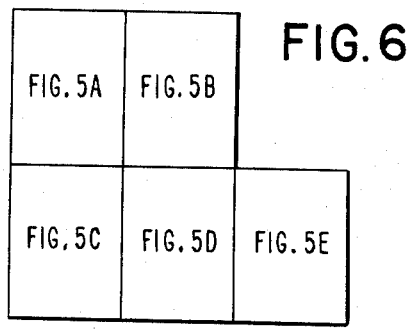
FIG. 6, on the sheet containing
Figure 5E:
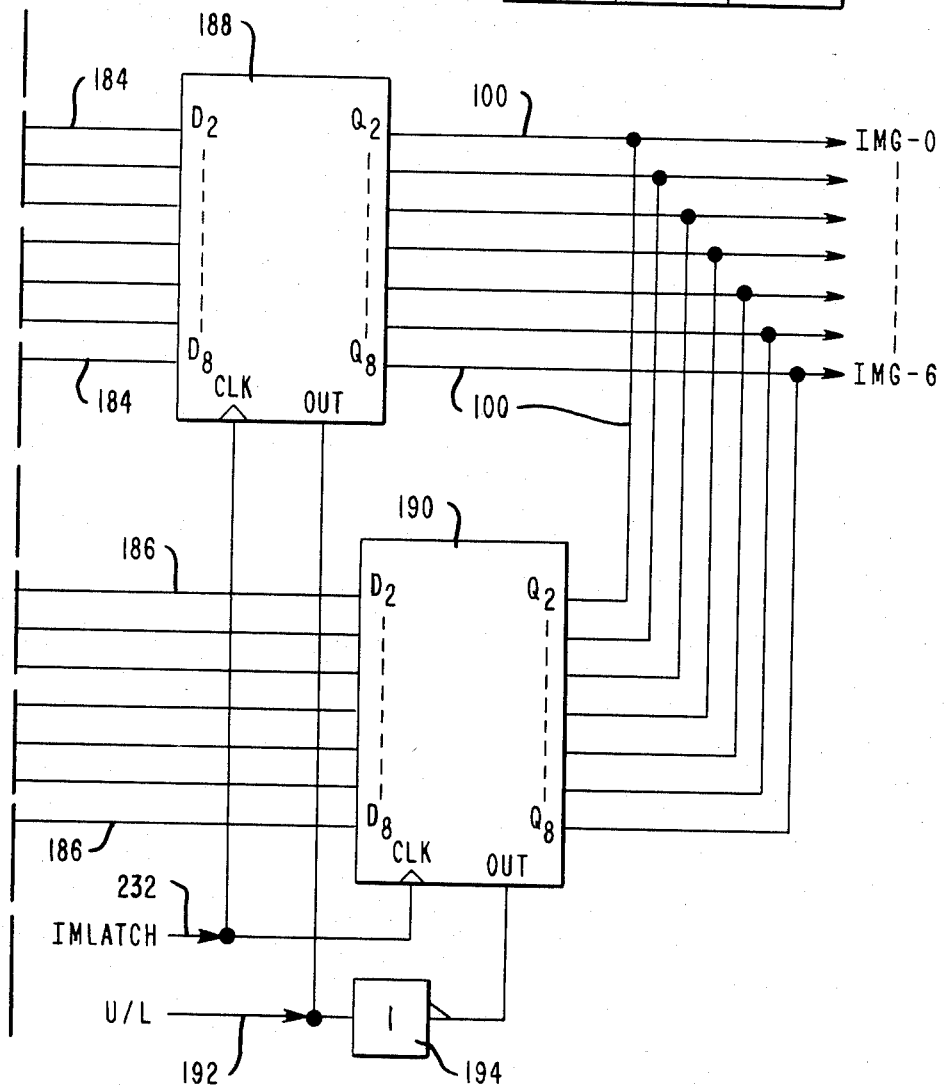
Figure 7A:
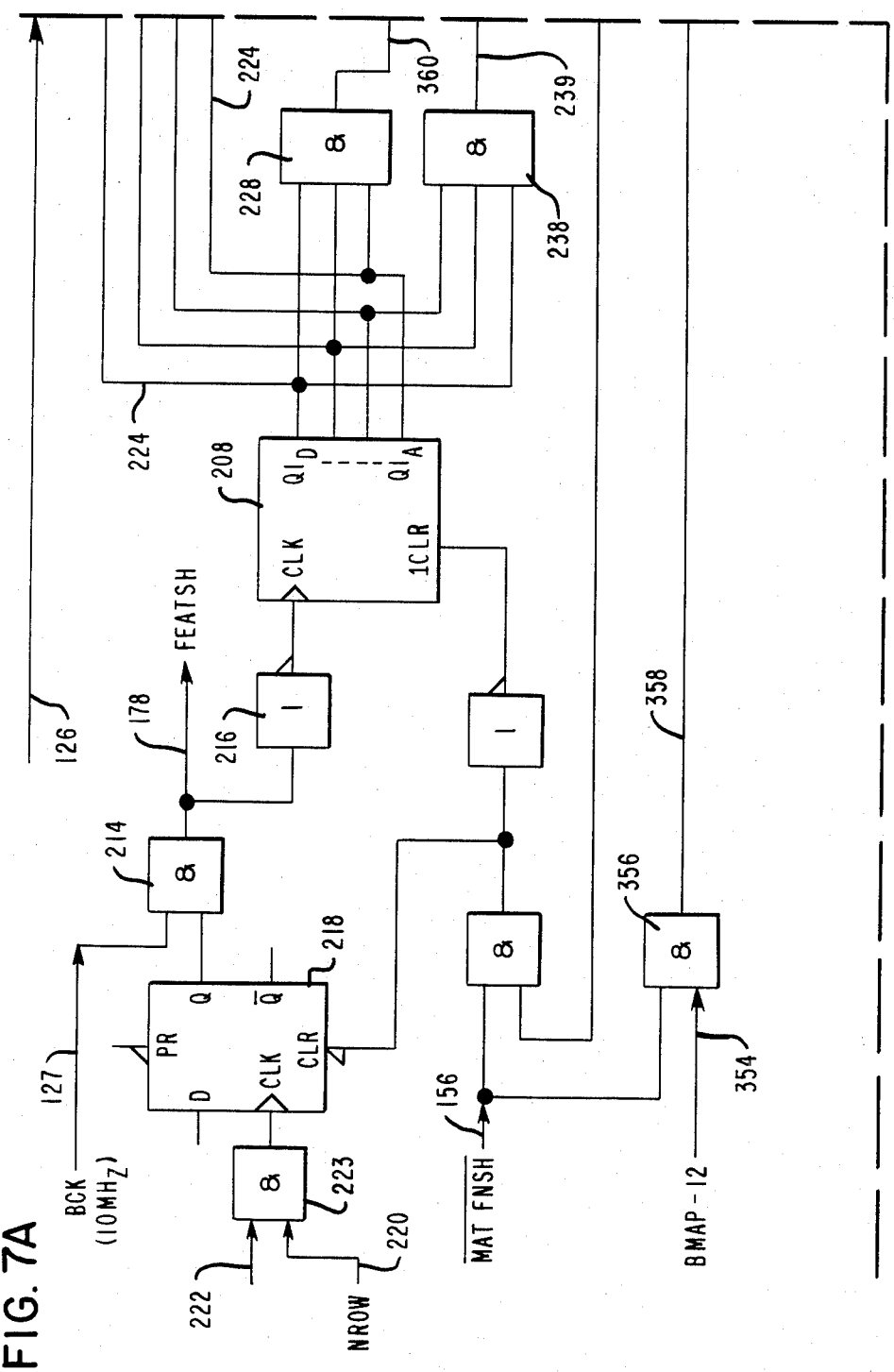
Figure 7C:
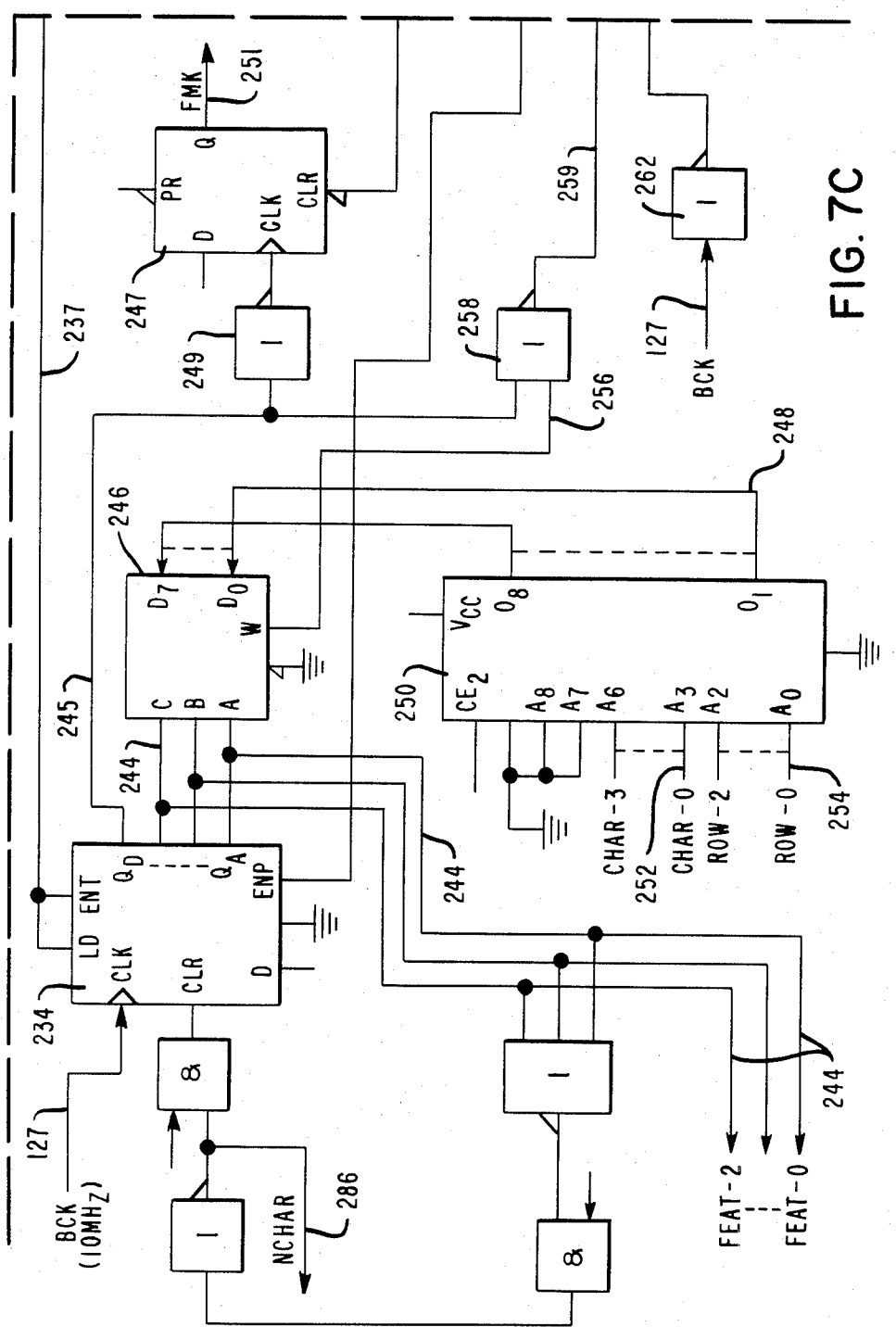

In the operation of the system, data signals representing the 14×10 bit map of the characters being scanned appearing on the lines 154 (FIG. 5C) are first loaded into the RAM buffer units 148–152 inclusive and then into the RAM buffer units 142–146 inclusive (FIG. 5D) under the control of the Counter 82 (FIG. 5B). These columns of data bits are then transmitted to the decoder 164 which also receives over lines 166 from the counter 320 (FIG. 9B) data signals identifying which row of the bit map comprises the top row of the character. The selected top row of fourteen data bits are then transmitted through the serial-in-parallel-out registers 176 and 182 (FIG. 5D) from where the data bits are shifted into the buffers units 188 and 190 (FIG. 5E) which output each row of the bit map to all of the Template look-up tables 196a–196n inclusive (FIGS. 11–13 and 15–17 inclusive) in which each table matches the row of the data bits with the templates stored therein. The templates comprise the features which must be found in each row to match the character associated with the table. The tables 196a–196n will perform two matching operations on each row of data. The data bits of each row are shifted from the registers 176 and 182 (FIG. 5D) to the buffers 188 and 190 (FIG. 5E) under the control of the signal IMLATCH appearing on line 232 and outputted by the flip-flop 230 (FIG. 7B). The flip-flop 230 is clocked by a high signal outputted by the AND gate 228 (FIG. 7A) upon the counter 208 (FIG. 7A) reaching a count of thirteen to output the signal IMLATCH over line 232 enabling the first thirteen bits of each row to be stored in the buffer members 188 and 190. Upon the first 13 bits of each row being shifted into the buffers 188 and 190 and then into the look-up tables 196a–196n inclusive, the multiplexer 287 (FIG. 9A) will be enabled by the operation of the counter 284 (FIG. 9A) to start outputting the look-up tables 196a–196n inclusive enabling signals BMAP0–BMAP14 resulting in the tables 196a–196n inclusive performing the first matching operation on the first thirteen bits in the row. Upon the multiplexer 287 outputting the high signal BMAP-12 over line 354, the signal is inputted into the AND gate 356 (FIG. 7A) and outputted over line 358 to the clear input of the flip-flop 230 (FIG. 7B) resetting the flip-flop thereby disabling the signal IMLATCH. The output count of the counter 208 is also transmitted through the AND gate 238 (FIG. 7A) over line 239, through the AND gate 240 (FIG. 7B) to the clock input of the flip-flop 236 whose Q output signal appearing on line 237 enables the counter 234 (FIG. 7C) whose output count is used by the demultiplexer 246 to identify the feature that is required to be matched in the row of data bits that is presently being examined by the Template tables 196a–196n inclusive.

Upon the multiplexer 287 (FIG. 9A) outputting the high signal BMAP-14 over line 290 at the conclusion of the first matching operation, the flip-flop 292 is clocked to output a high signal over the Q output line 293 and through the OR gate 362 (FIG. 7B) clocking the flip-flop 230. The clocking of the flip-flop 230 will again output the high signal IMLATCH which enables the fourteenth bit of the row to be shifted into the buffers 188 and 190 enabling the look-up tables 196a–196n inclusive to perform a second matching operation on the fourteen bits in the row.

During a feature comparison operation, each bit of the feature is compared simultaneously to each bit of the row of the unknown bit map. If the bit values are equal, that is, both 1's or both 0's, no weighting values are generated. If, however, the bit value is different, then the weight associated with the bit is accumulated. If the bit weight was a logical, then a logical counter within the table is incremented. When all 14 bits of the feature have been compared, the total accumulated weight, which is called the "distance", together with the number of logical violations, form a figure of merit for the correlation of the feature to the row of the bit map. The lower the number, the better the correlation. When more than one feature is allowed in a given row, each feature is compared in turn and the results (distance and number of logical violations) are stored. When all features have been compared, an effective distance is formed for each by the following formula:

Eff. Dist. = Distance + 16 × (Number of Logical Violations)

Then the selected character is the one having the minimum effective distance. The following rules apply:

Do not select a feature having more than one logical violation. If all features have more than one logical violation, then the first feature of the group is accepted since one feature must be selected.

In accordance with the feature matching operation described above, the output data of the look-up tables 196a–196n will be transmitted over lines 326 to the accumulators 328 and 330 (FIG. 18A) which accumulate the distance values for each of the templates and the accumulator 336 (FIG. 18B) which sums the logical violations generated. The sum of the logicals for the bit map are outputted through the latch 338 and the buffer 346 for transmission over lines 350 to the CPU 74 (FIG. 1). In a similar manner, the total distances generated for the bit map are outputted through the buffer unit 348 and over lines 352 to the CPU 74.

Figure 18A:
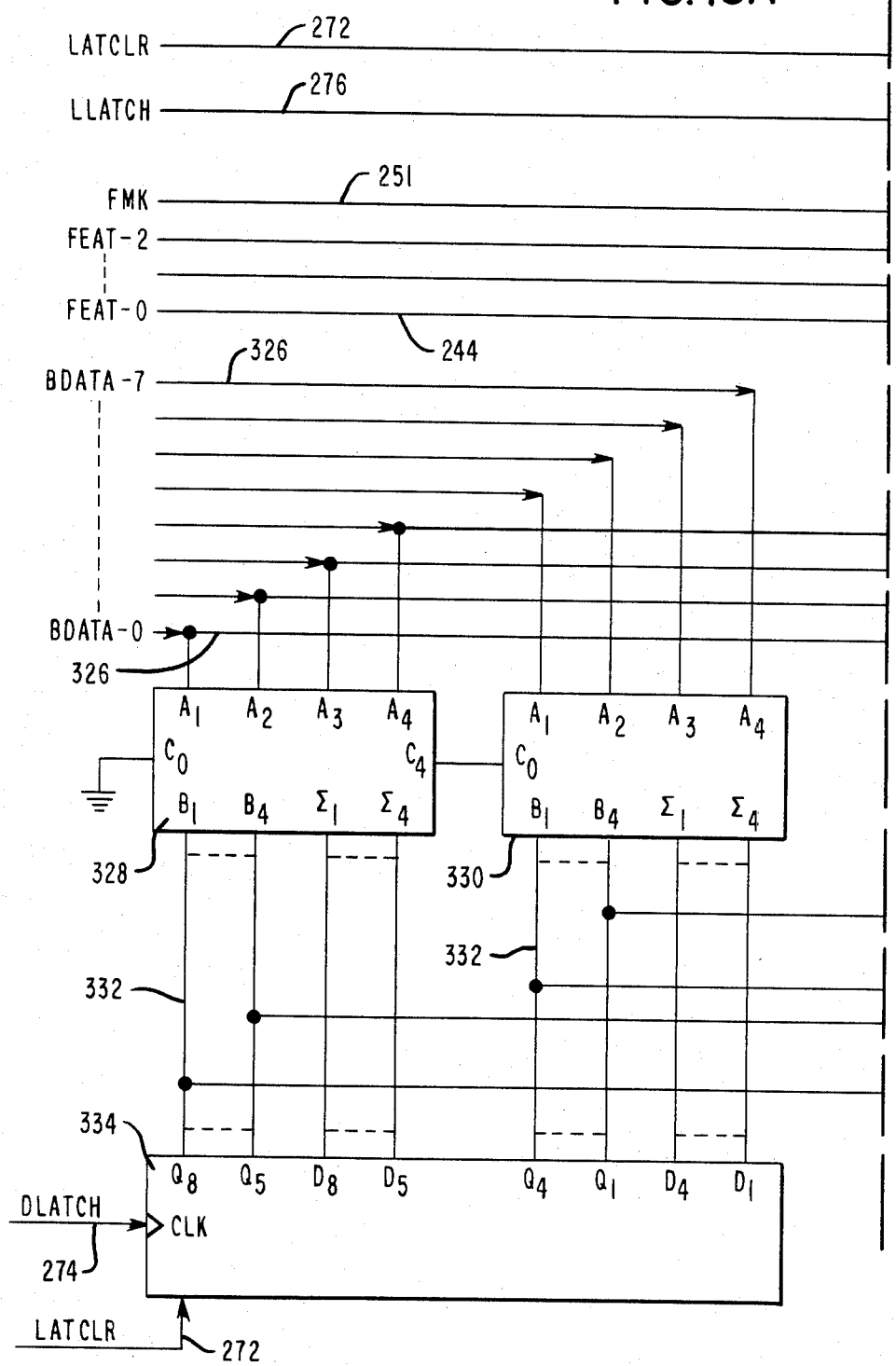
FIGS. 18A and 18B, taken together, disclose the logic circuits used in accumulating the number of logicals and the distance differences between the unknown character and the known characters.
Figure 18B:
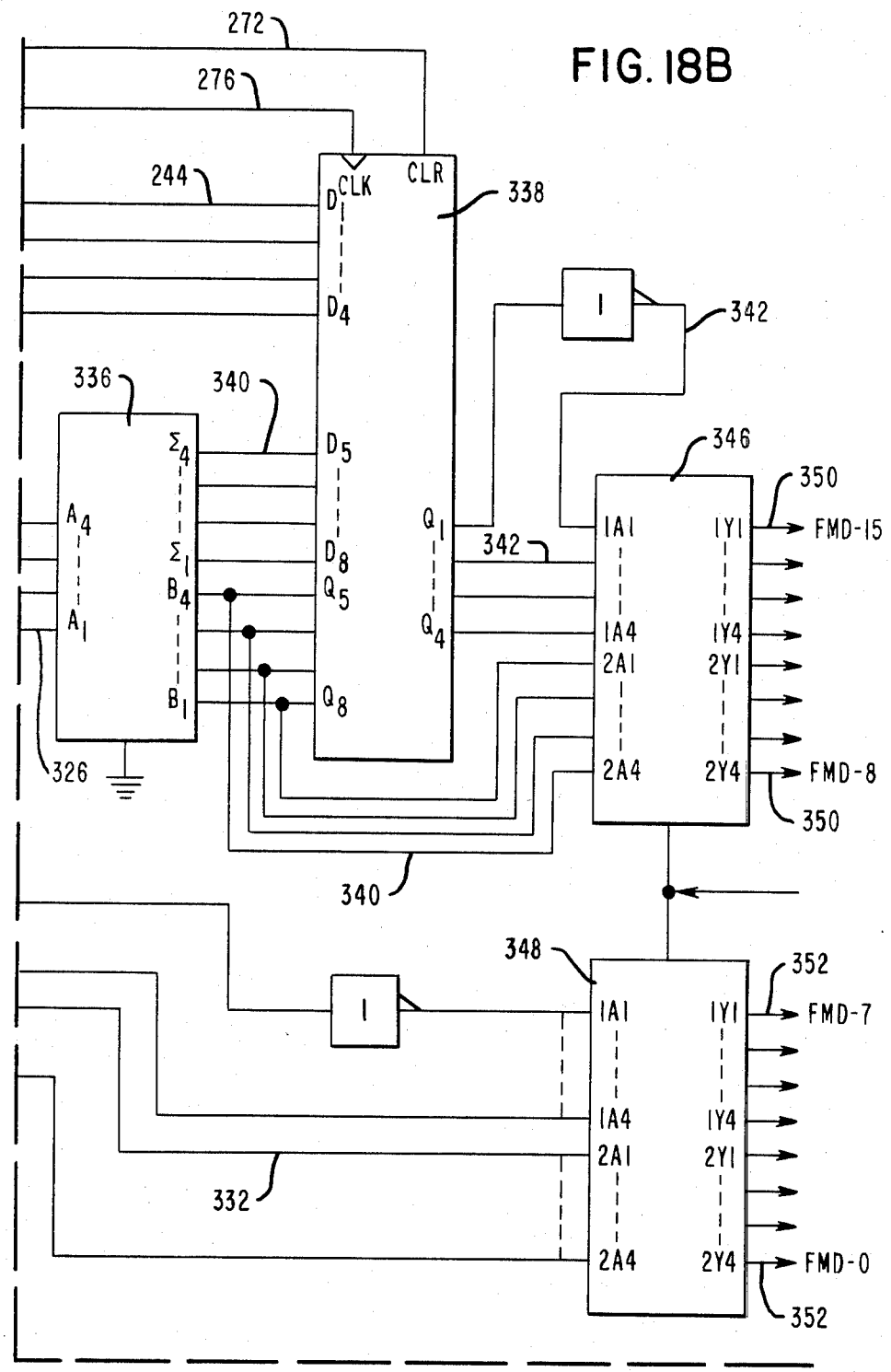

The EPROM look-up tables 196a–196n inclusive will perform two other feature matching operations first. In the first operation, the look-up tables force certain distinguishing features of a character's feature set into the unknown bit map even if another feature which is allowed in the row may have a lower effective distance. This operation is necessary since it can never be predicted exactly where certain features will occur in the bit map due to the doubling effect described earlier. Referring again to the features and rules for a "2" (FIGS. 2A and 2B), it is observed that Feature 2 (F2) will ideally occur in both rows 2 and 3. However, due to doubling, it may occur in either row 2 or row 3 but not necessarily both. Therefore, F1 must be allowed in rows 2 and 3 as well; in fact, F1 is allowed in every row. Since F2 is a distinguishing feature of the "2", it must be selected in either row 2 or 3. Similarly, F3 must be selected in either row 5 or 6. By forcing these two features, a high effective distance is insured when comparing the "2" feature set to a bit map that it not a character "2". This reduces the probability of misreading. This operation, in effect, performs a function which is exactly complementary to the normal feature selection operation. It selects which of the given number of rows is the best match for a certain feature instead of selecting the best match of a number of features in a certain row. In the second operation, the look-up tables perform a feature selection for every row that has not already been matched by either of the previous two feature matching operations. When all eight rows have been matched, the comparison is complete and the distance and number of logical violations for each row are stored in the flip-flops 334 (FIG. 18A) and 338 (FIG. 18B). The three operations just described are repeated for each character feature set until all fourteen character feature sets have been compared. The resulting data is then transmitted over lines 350 (FIG. 18B) and 352 to the CPU 74 (FIG. 1) which in response to the data received selects that character which most closely resembles the unknown character in accordance with the data bits received.

The integrated circuit networks having a numerical designation disclosed herein are commercially available from the Texas Instruments Corporation of Dallas, Tx.

While the principles of the invention have now been made clear in an illustrated embodiment, it will be obvious to those skilled in the art that many modifications of structure, arrangements, elements and components can be made which are particularly adapted for specific environments without departing from those principles. The appended claims are therefore intended to cover and embrace any such modification within the limits only of the true spirit and scope of the invention.

We claim:

1. In a character recognition system wherein a plurality of adjacent rows of first and second binary signals are generated, in which the first binary signals represent a portion of an unknown character and the second binary signals represent a portion of the background of the unknown character, an apparatus for recognizing the unknown character comprising:

first means for storing the rows of binary bits representing the first and second binary signals;

second means for storing binary bits representing third and fourth binary signals in which the third binary signals represent a portion of a known character and the fourth binary signal represents a portion of the background of the known character, said third and fourth binary signals being assigned a numerical value in accordance to the importance of said signals to the configuration of the known character and a second value representing the required presence of certain of said third and fourth binary signals in the configuration of the unknown character and for comparing the binary bits in the location of said first and second binary signals in each row of the unknown character which the binary bits in the corresponding location of the third and fourth binary signals of the known characters, said second storing and comparing means outputting a first signal representing the sum of the numerical values assigned to the third and fourth binary signals equivalent to the first and second binary signals not found in each row between the known and unknown character and a second signal representing the number of said certain of said third and fourth binary signals not equivalent to the first and second binary signals found in each row of said unknown character;

means connected to said comparing means for accumulating said first and second signals for each known character;

and processing means connected to said accumulating means for identifying the unknown character with the known character having the minimum values for the accumulated first and second signals.

2. The apparatus of claim 1 which further includes first logic means for shifting each row of binary bits representing said first and second binary signals from said first storing means to said second storing and comparing means, said first logic means shifting a number of said first and second binary signals in each row of the unknown character to said second storing and comparing means which is less than the number of first and second binary signals in the row stored in said first storing means and control means enabling said second storing and comparing means to compare the binary bits in the location of the first and second binary signals of the unknown character shifted to said comparing means with the binary bits in the corresponding location of the third and fourth binary signals of the known characters, said control means enabling said first logic means to shift the remaining number of first and second binary signals signals in each row of the unknown character into the second storing and comparing means whereby the second storing and comparing means will again compare the first and second binary signals of the unknown character shifted into the second storing and comparing means with the third and fourth binary signals of the known characters.

3. The apparatus of claim 2 which further includes:
means for generating a plurality of first control signals for enabling said accumulating means for operation;
means for outputting second control signals identifying said certain of said third and fourth binary signals of each of the known characters;
and means connected to said generating means and said outputting means for detecting the presence of said certain of said third and fourth binary signals of a known character in each row of binary bits representing said first and second binary signals, said detecting means disabling the operation of said generating means upon finding a row not containing the presence of said certain of said third and fourth binary signals of the known character.

4. The apparatus of claim 3 in which said detecting means includes first counter means for generating the address of the row of the unknown character being compared, second counter means for generating the address of the row of the known character being compared, said second counter means connected to said second storing means enabling said second storing means to output said third and fourth binary signals required for the row of the known character being compared in response to receiving the address of said row and decoding means connected to the output of said first counter means and said second storing means, said decoding means outputting a third control signal disabling the operation of said second generating means upon finding a row of the unknown character not required to have said third and fourth binary signals.

5. In a character recognition system in which are generated a plurality of adjacent rows of first and second binary signals representing an unknown character in which the first binary signals represent a portion of the unknown character and the second binary signals represent a portion of the background of the unknown character and first control signals identifying the row of said first and second binary signals comprising the top row of the unknown character, an apparatus for recognizing the unknown character comprising:
first storage means for storing rows of binary bits representing the first and second binary signals signals of the unknown character;
first means for generating the address of each of the rows of binary bits of the unknown character;
selecting means connected to said first storage means and said first generating means for outputting a row of first and second binary signals stored in said first storage means in accordance with the address generated by said generating means;
second storage means for storing the row of signals outputted by said selecting means;
a plurality of memory devices having stored therein binary bits representing third and fourth binary signals in which the third binary signals represent a portion of an associated known character and the fourth binary signals representing a portion of the background of the known character, said third and fourth binary signals being assigned a numerical value in accordance to the importance of said signal to the configuration of the known character and a second value representing the required presence of certain of said third and fourth binary signals in the configuration of the unknown character, said memory devices comparing the binary bits in the location of the row of signals stored in said second storage means with the binary bits in the corresponding location of the row of signals stored in said memory devices, said memory devices further outputting a second control signal representing the sum of the numerical values assigned to the third and fourth binary signals equivalent to the first and second binary signals not found in a row of the unknown character and a third control signal representing the number of said certain of said third and fourth binary signals not equivalent to the first and second binary signals found in a row of the unknown character;
means connected to said memory devices for accumulating both of said second and third control signals for each known character;
and processing means connected to said accumulating means for identifying the unknown character with a known character having the minimum number of accumulated second and third signals.

6. The apparatus of claim 5 which further includes means for controlling the operation of said second storage means for storing the rows of signals outputted by said selecting means, said controlling means enabling said second storage means to store a predetermined number of said first and second binary signals which is less than the number of signals outputted in each row, and sequencing means for outputting a plurality of fourth control signals for sequentially enabling the operation of each of said memory devices, said sequencing means enabling said controlling means to operate said second storage means to store the remaining first and second binary signals in each row whereby said memory devices will compare the first and second binary signals stored in said second storage means with the third and fourth binary signals of the known characters.

7. The apparatus of claim 6 in which said controlling means includes second counter means for outputting a count equal to the number of first and second binary signals in a row, a first bistable device connected to said second storage means for outputting a fifth control signal enabling said second storage means to store the signals outputted by said selecting means when operated and first logic circuit means connected to said counter means for outputting an operating signal to said bistable device in response to receiving certain of said counts, said logic circuit means disabling said bistable device upon receiving a predetermined count from said second counter means whereby said second storage means stores signals in each row which are less than a maximum value of signals in the row.

8. The apparatus of claim 7 in which said sequencing means includes a multiplexer member outputting said fourth control signals and a second bistable device connected to said multiplexing member and operated by the last of said plurality of fourth control signals outputted by said multiplexer member for enabling said first bistable device to output said fifth control signal enabling said second storage means to store the remaining signals in each row outputted by said selecting means.

9. The apparatus of claim 8 which further includes:
second means for generating a plurality of sixith control signals for enabling said accumulating means for operation;
fourth storage means for storing the third and fourth binary signals for each of the known characters;
and means connected to said second generating means and said fourth storage member for detecting the presence of the third and fourth binary signals signals of the known characters for each row of first and second binary signals of said unknown character, said detecting means disabling the operation of said second generating means upon finding a row not requiring the presence of said third and fourth binary signals signals of the known characters.

10. The apparatus of claim 9 in which said detecting means includes third counter means for generating the address of the row of the unknown character being compared, fourth counter means for generating the address of the row of the known character being compared, said fourth counter means connected to said fourth storage member enabling said fourth storage member to output the third and fourth binary signals for the row of the known character being compared in response to receiving the address of said row and decoding means connected to the output of said third counter means and said fourth storage member, said decoding means outputting a seventh control signal disabling the operation of said second generating means upon finding a row of the unknown character not having third and fourth binary signals of a known character.

11. A method for recognizing an unknown character represented by a plurality of parallel rows of first and second binary signals in which the first binary signal represents a portion of the unknown character and the second binary signal represents a portion of the background area adjacent the unknown character comprising the steps of:
storing a plurality of rows of binary bits representing said first and second binary signals in a first position in a first storage unit;
shifting each row of said binary bits to a second position in the storage unit along said row;
storing a plurality of rows of binary bits representing third and fourth binary signals in a second storage unit in which the third binary signal represents a portion of a known character and the fourth binary signal represents the background area adjacent the known character;
comparing the binary bits in the locations of said first and second binary signals in said second position with the binary bits in the corresponding locations of the third and fourth binary signals in said second storage unit;
assigning a numerical value to each of said third and fourth binary signals in accordance to the importance of said third and fourth binary signals to the configuration of the known character;
generating a first signal representing the sum of the numerical values assigned to the third and fourth binary signals equivalent to the first and second binary signals not found in said second position;
shifting the rows of said first and second binary signals to said first position;
comparing the binary bits in the locations of said first and second binary signals in said first position with the binary bits in the corresponding locations of said third and fourth binary signals in said second storage unit;
assigning a relative value of importance to certain of said third and fourth binary signals which are required to be found in the configuration of the known character;
generating a second signal representing the sum of the numerical values assigned to the third and fourth binary signals not equivalent to the first and second binary signals found in said first position;
storing a plurality of rows of binary bits representing fifth and sixth binary signals in a third storage unit in which the fifth binary signal represents a portion of the known character and the sixth binary signal represents a portion of the background of the known character:
comparing each row of binary bits in the location of said first and second binary signals when in said first and second positions with the binary bits in the corresponding locations of said fifth and sixth binary signals in said third storage unit;
generating a third signal representing the number of said fifth and sixth binary signals not equivalent to the first and second binary signals found in said first and second positions;
and recognizing the unknown character in accordance with the value of said first, second and third signals.

* * * * *